(12) United States Patent
Hildebrand

(10) Patent No.: US 10,152,599 B2
(45) Date of Patent: Dec. 11, 2018

(54) SECURITY MECHANISMS FOR EXTREME DEEP SLEEP STATE

(71) Applicant: Intel IP Corporation, Santa Clara, CA (US)

(72) Inventor: Uwe Hildebrand, Fuerth (DE)

(73) Assignee: Intel IP Corporation, Santa Clara, CA (US)

(*) Notice: Subject to any disclaimer, the term of this patent is extended or adjusted under 35 U.S.C. 154(b) by 43 days.

(21) Appl. No.: 14/974,039

(22) Filed: Dec. 18, 2015

(65) Prior Publication Data

US 2017/0177870 A1    Jun. 22, 2017

(51) Int. Cl.
G06F 21/57      (2013.01)
G06F 9/4401     (2018.01)
G06F 21/81      (2013.01)

(52) U.S. Cl.
CPC .......... G06F 21/57 (2013.01); G06F 9/4418 (2013.01); G06F 21/575 (2013.01); G06F 21/81 (2013.01); *G06F 2221/034* (2013.01)

(58) Field of Classification Search
CPC ....... G06F 21/57; G06F 9/4418; G06F 21/575
See application file for complete search history.

(56) References Cited

U.S. PATENT DOCUMENTS 7,284,136 B2   10/2007 Zimmer et al.
9,158,921 B1   10/2015 Gupta et al.
2004/0003273 A1   1/2004 Grawrock et al.
2004/0148536 A1*  7/2004 Zimmer ................ G06F 1/3203
                                                     713/323
2014/0129818 A1   5/2014 Li et al.
2015/0178500 A1   6/2015 Pearson et al.

OTHER PUBLICATIONS

Mohan (Enter Sleep Mode and Wakeup Using RTC, Jan. 25, 2011, 7 pages) (Year: 2011).*
International Search Report and Written Opinion of PCT Patent Application No. PCT/US2016/061953, dated Feb. 17, 2017; 12 pages, dated Feb. 17, 2017.
Intel Corporation, IA-32 Intel® Architecture Software Developer's Manual—vol. 2: Instruction Set Reference, 978 pages, 2003.

* cited by examiner

*Primary Examiner* — Oleg Korsak
(74) *Attorney, Agent, or Firm* — Alliance IP, LLC

(57) ABSTRACT

A processor includes logic to generate a wakeup code value for a deep sleep state in which the processor is powered down, store the wakeup code value to a first location in a power domain in which power is maintained in the deep sleep state, store the wakeup code value to a second location in a non-volatile memory device, and initiate entry into the deep sleep state. The processor also includes logic to begin execution of a wakeup sequence upon waking up from the deep sleep state. The wakeup sequence includes a determination of whether a value read from the second location and a value read from the first location match. If they do not match, the processor triggers an exception handling sequence, which may include a secure boot sequence. If they match, the processor continues executing the wakeup sequence without executing a secure boot sequence.

23 Claims, 28 Drawing Sheets

FIG. 3A

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

341 — PACKED HALF

| 127 | 96 95 | 64 63 | 32 31 | 0 |
|---|---|---|---|---|
| SINGLE 3 | SINGLE 2 | SINGLE 1 | SINGLE 0 | |

342 — PACKED SINGLE

| 127 | 64 63 | 0 |
|---|---|---|
| DOUBLE 1 | DOUBLE 0 | |

343 — PACKED DOUBLE

FIG. 3B

```
127    120 119   112 111   104 103              24 23    16 15     8 7        0
| bbbb bbbb | bbbb bbbb | bbbb bbbb |  *   *   *  | bbbb bbbb | bbbb bbbb | bbbb bbbb |
```
UNSIGNED PACKED BYTE REPRESENTATION 344

```
127    120 119   112 111   104 103              24 23    16 15     8 7        0
| sbbb bbbb | sbbb bbbb | sbbb bbbb |  *   *   *  | sbbb bbbb | sbbb bbbb | sbbb bbbb |
```
SIGNED PACKED BYTE REPRESENTATION 345

```
127              112 111                                    16 15            0
| wwww wwww wwww wwww |           *   *   *              | wwww wwww wwww wwww |
```
UNSIGNED PACKED WORD REPRESENTATION 346

```
127              112 111                                    16 15            0
| swww wwww wwww wwww |           *   *   *              | swww wwww wwww wwww |
```
SIGNED PACKED WORD REPRESENTATION 347

```
127                              92 91    32 31                              0
| dddd dddd dddd dddd dddd dddd dddd dddd | * * * | dddd dddd dddd dddd dddd dddd dddd dddd |
```
UNSIGNED PACKED DOUBLEWORD REPRESENTATION 348

```
127                              92 91    32 31                              0
| sddd dddd dddd dddd dddd dddd dddd dddd | * * * | sddd dddd dddd dddd dddd dddd dddd dddd |
```
SIGNED PACKED DOUBLEWORD REPRESENTATION 349

*FIG. 3C*

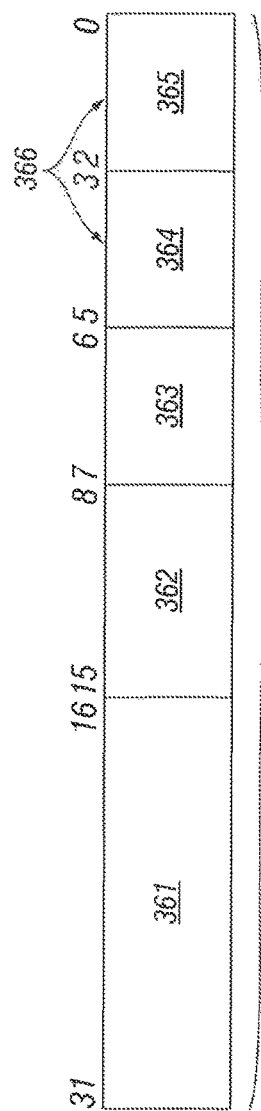
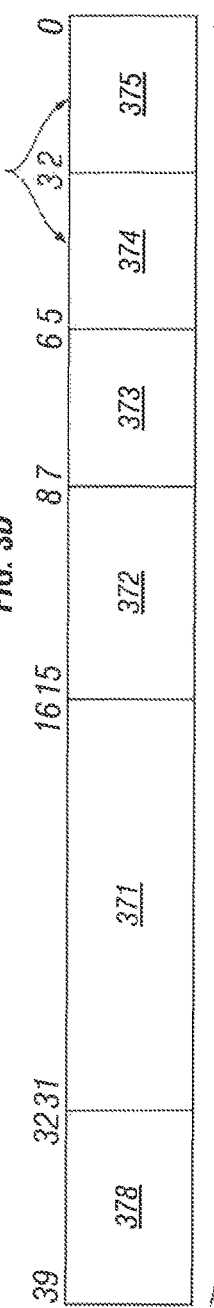
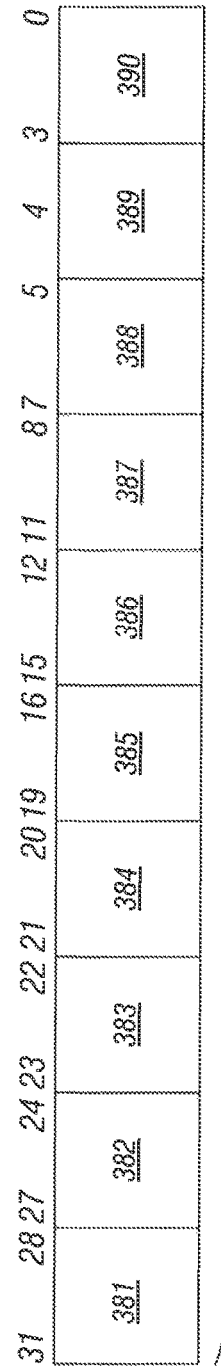
FIG. 3D
FIG. 3E
FIG. 3F

US 10,152,599 B2

SECURITY MECHANISMS FOR EXTREME DEEP SLEEP STATE

FIELD OF THE INVENTION

The present disclosure pertains to the field of processing logic, microprocessors, and associated instruction set architecture that, when executed by the processor or other processing logic within a processor, SoC device, or embedded system, perform logical, mathematical, or other functional operations.

DESCRIPTION OF RELATED ART

Multiprocessor systems are becoming more and more common. Applications of multiprocessor systems include dynamic domain partitioning all the way down to desktop computing, embedded systems, mobile platforms, or Internet of Things (IoT) devices. A power management unit may regulate the power that is provided to the processors in a multiprocessor system and to other components in the system. The power management unit may shut down the power to the system and may power up the system in response to detecting a power-up event. In response to the system being powered up, a processor may execute a secure boot sequence.

DESCRIPTION OF THE FIGURES

Embodiments are illustrated by way of example and not limitation in the Figures of the accompanying drawings:

FIG. 3A illustrates various packed data type representations in multimedia registers, in accordance with embodiments of the present disclosure;

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
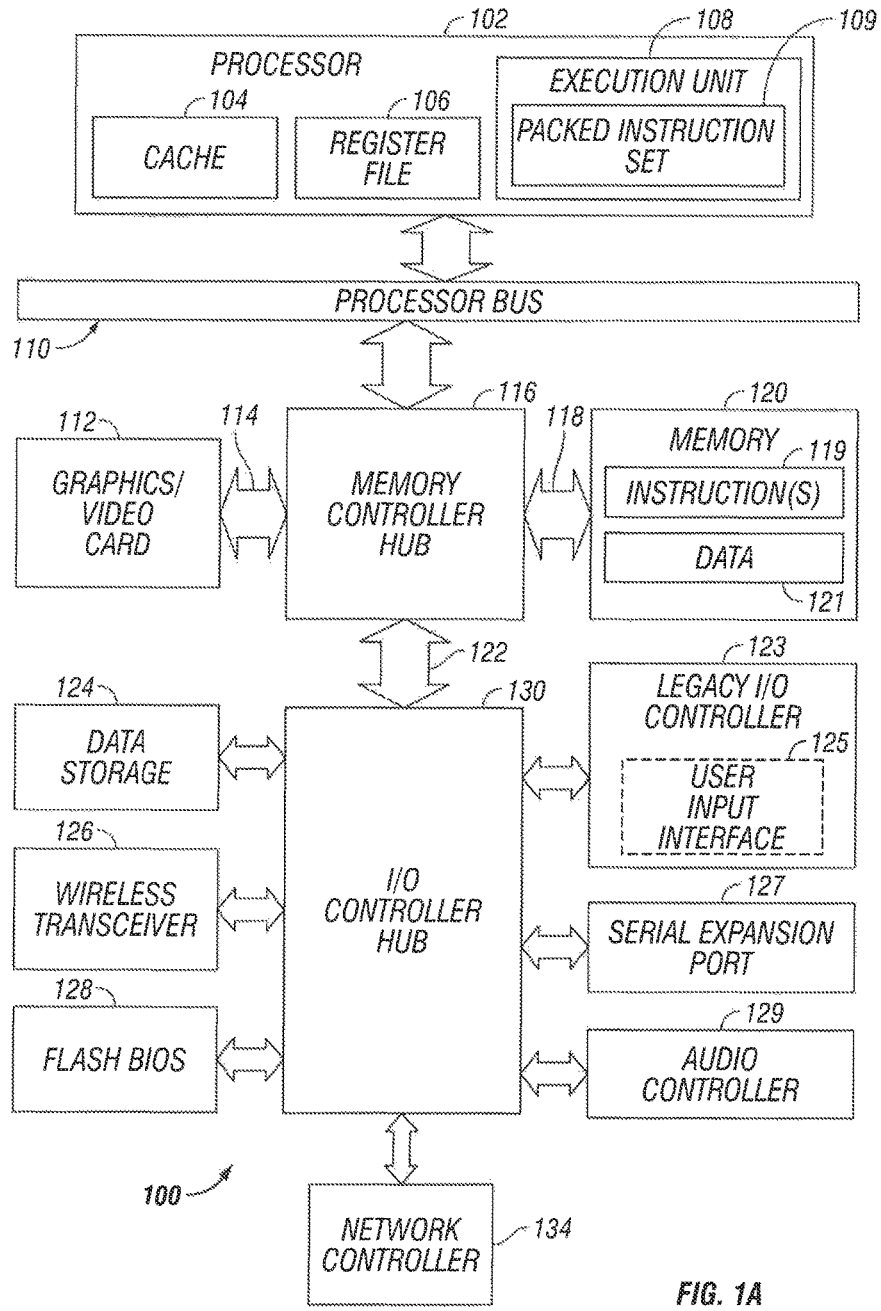
FIG. 1A is a block diagram of an exemplary computer system formed with a processor that may include execution units to execute an instruction, in accordance with embodiments of the present disclosure.

The following description describes an instruction and processing logic for entering and waking up from an extreme deep sleep state on a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS' operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
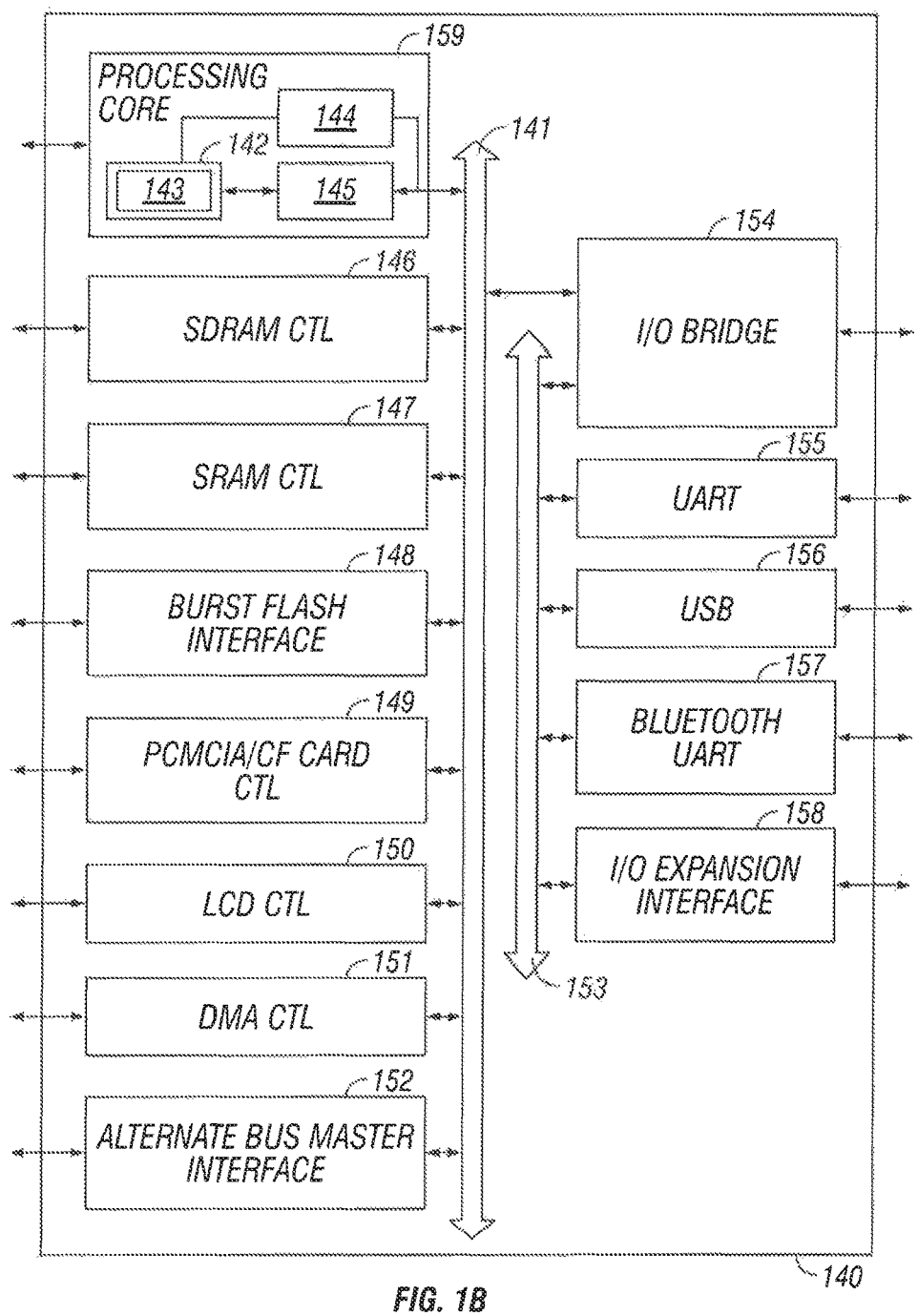
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
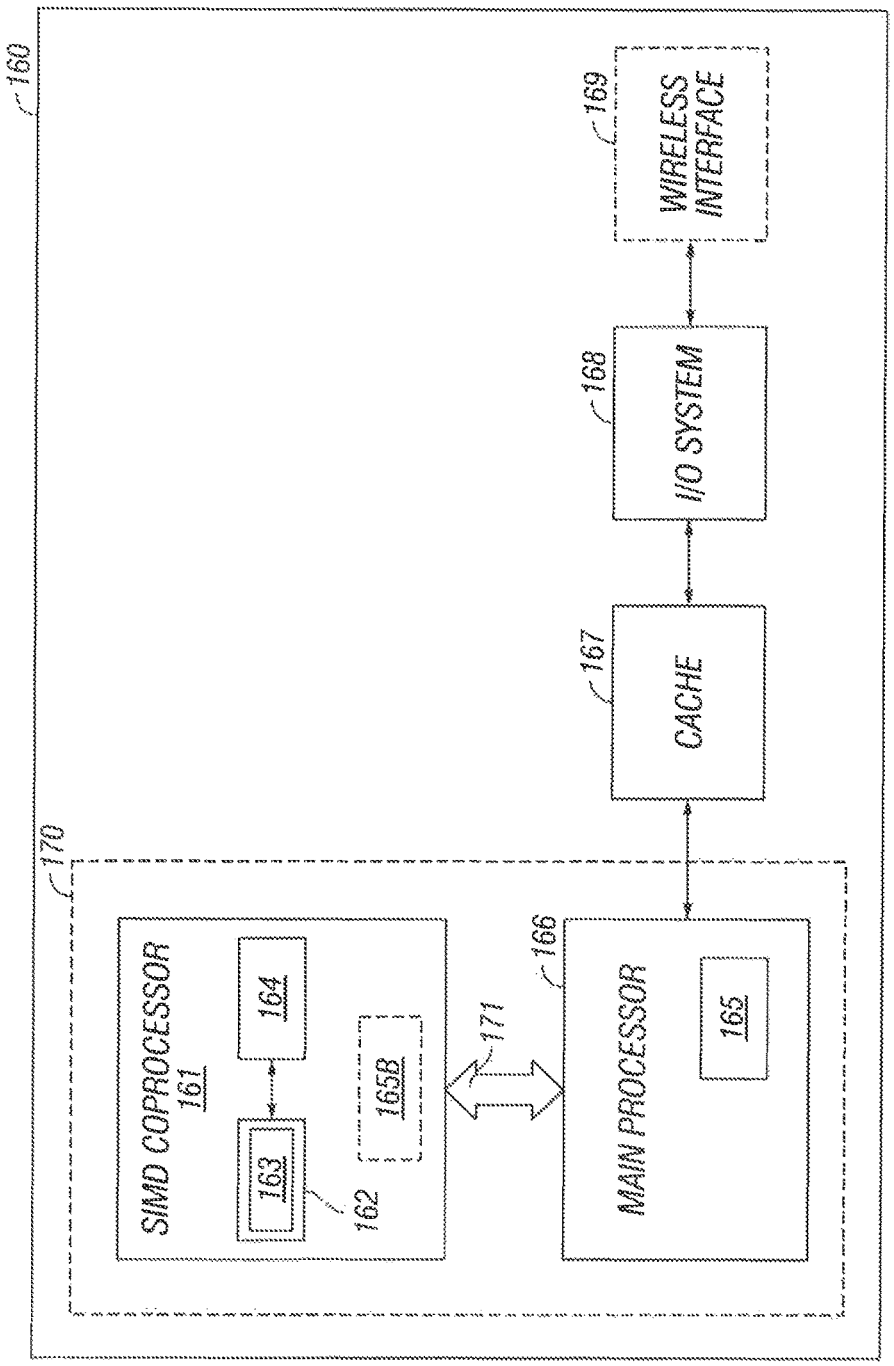
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
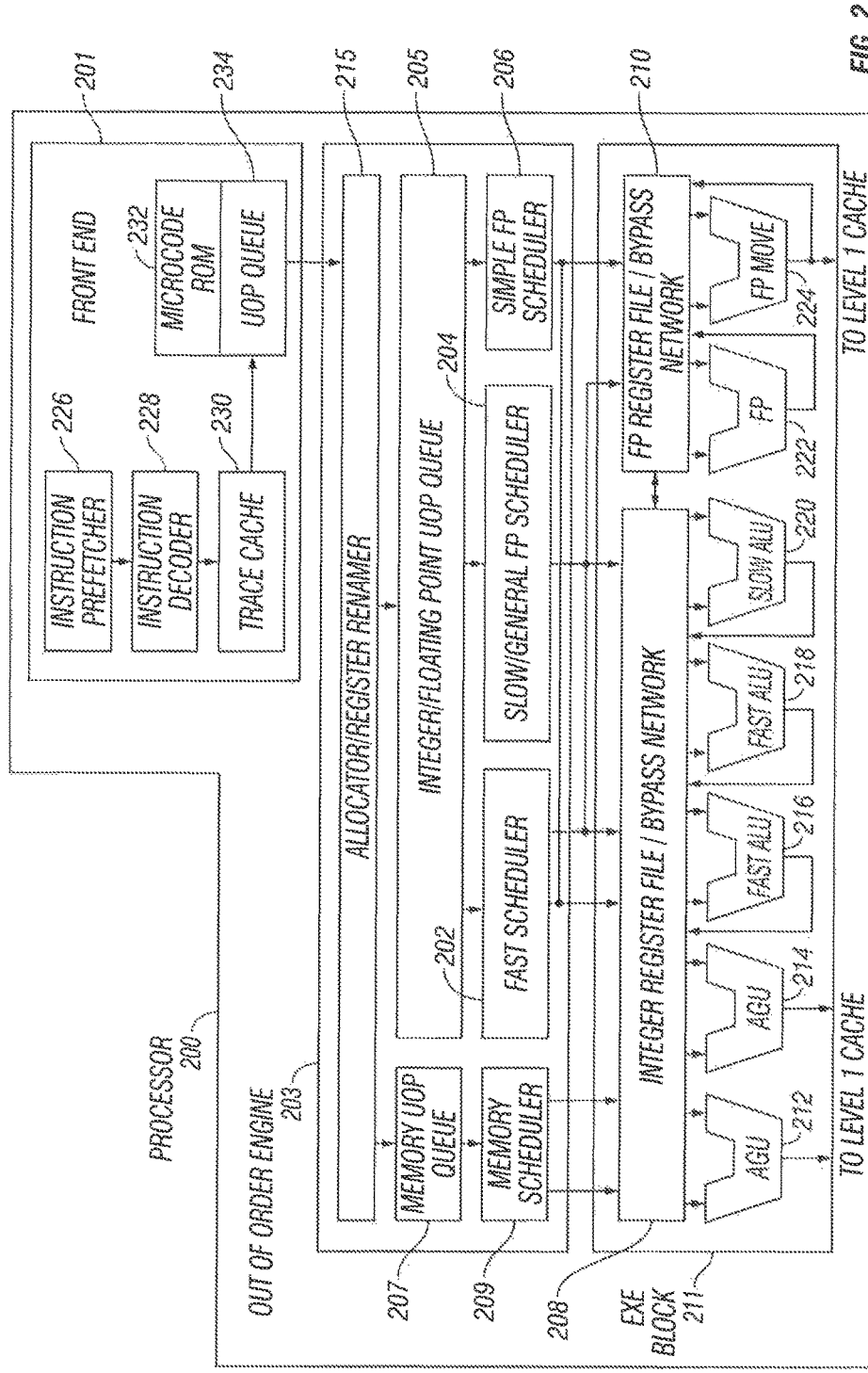
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
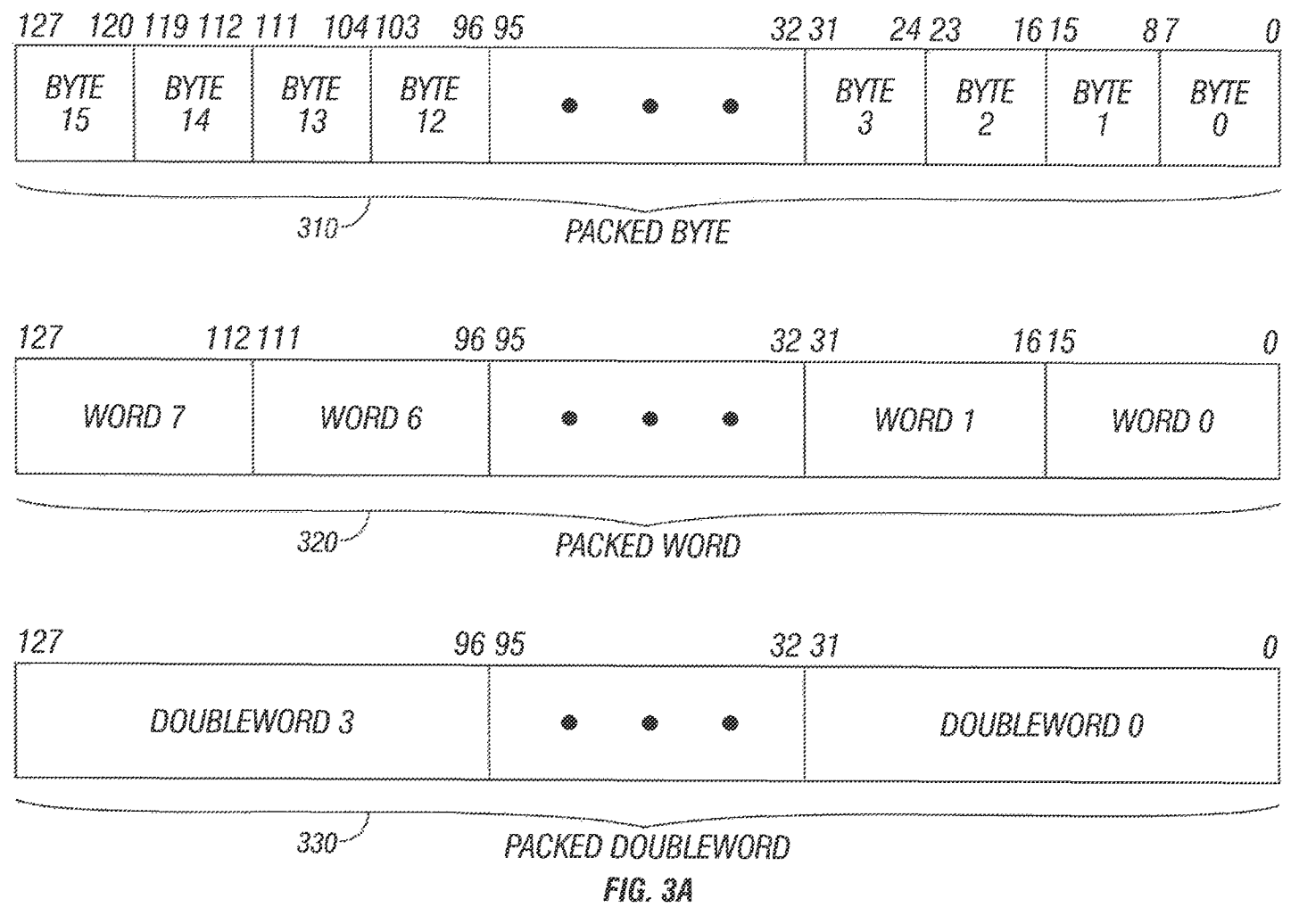

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and over-flow (V) detection may be done on SIMD fields. For some instructions, the type of saturation may be encoded by field 384.

Figure 4A:
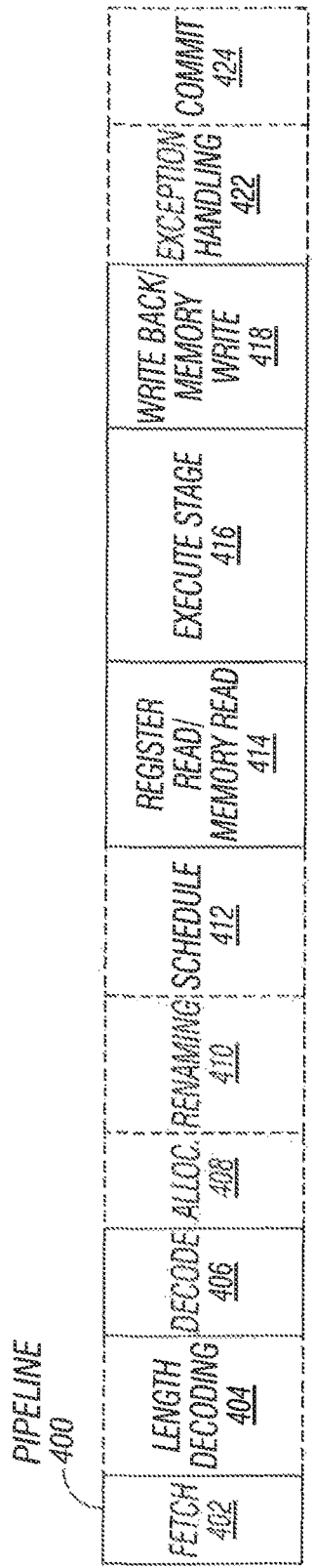
FIG. 4A is a block diagram illustrating an in-order pipeline and a register renaming stage, out-of-order issue/execution pipeline, in accordance with embodiments of the present disclosure.
Figure 4B:
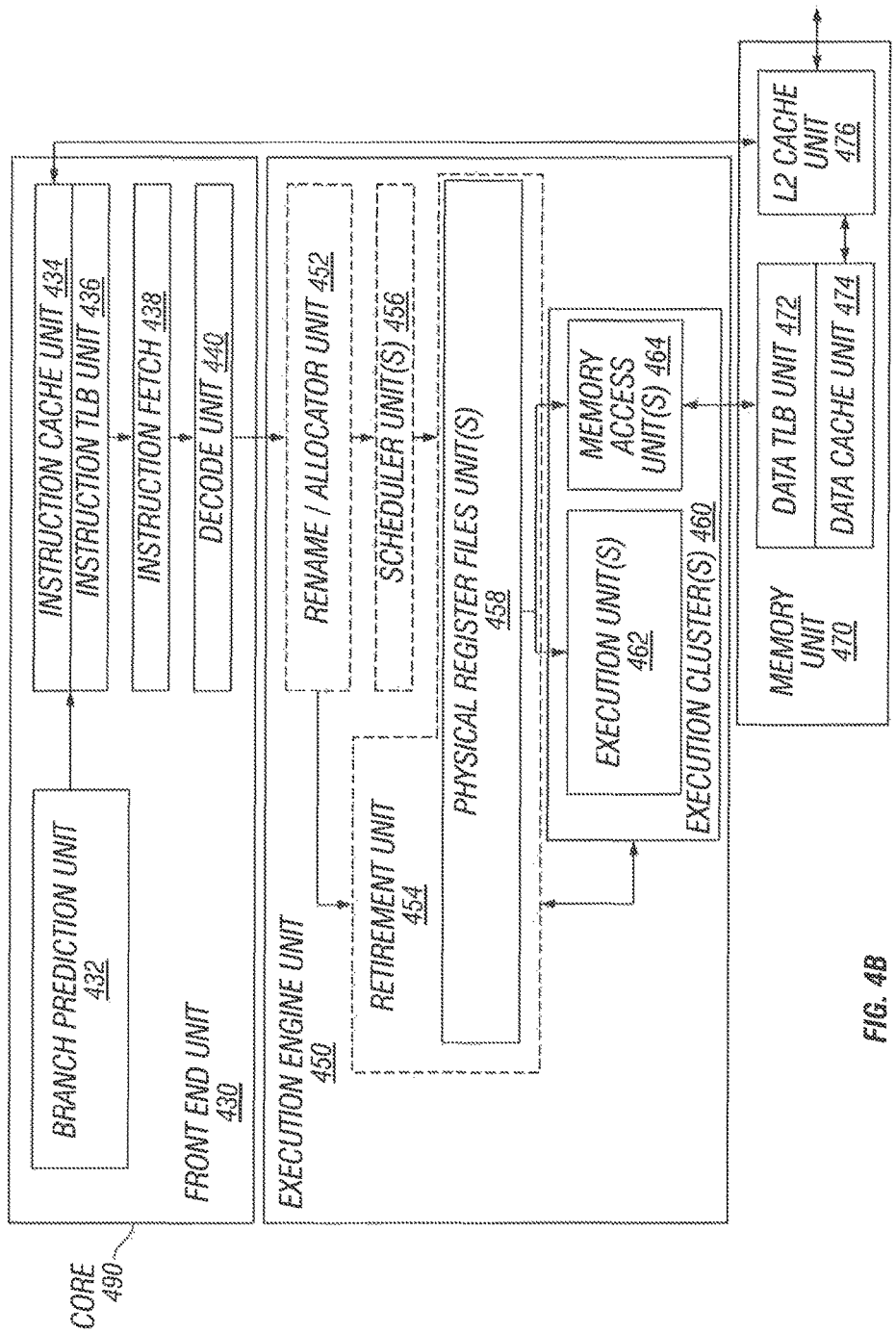
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
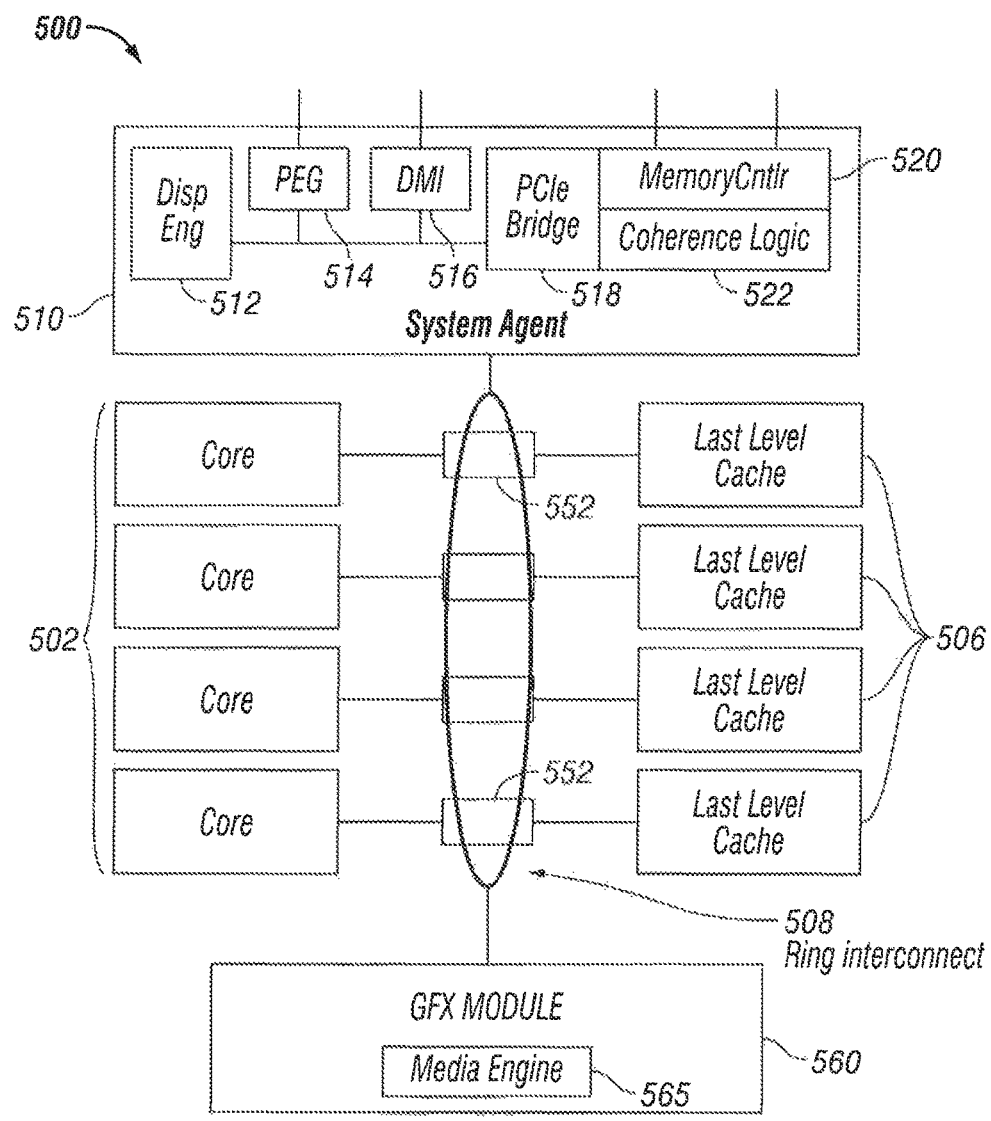
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
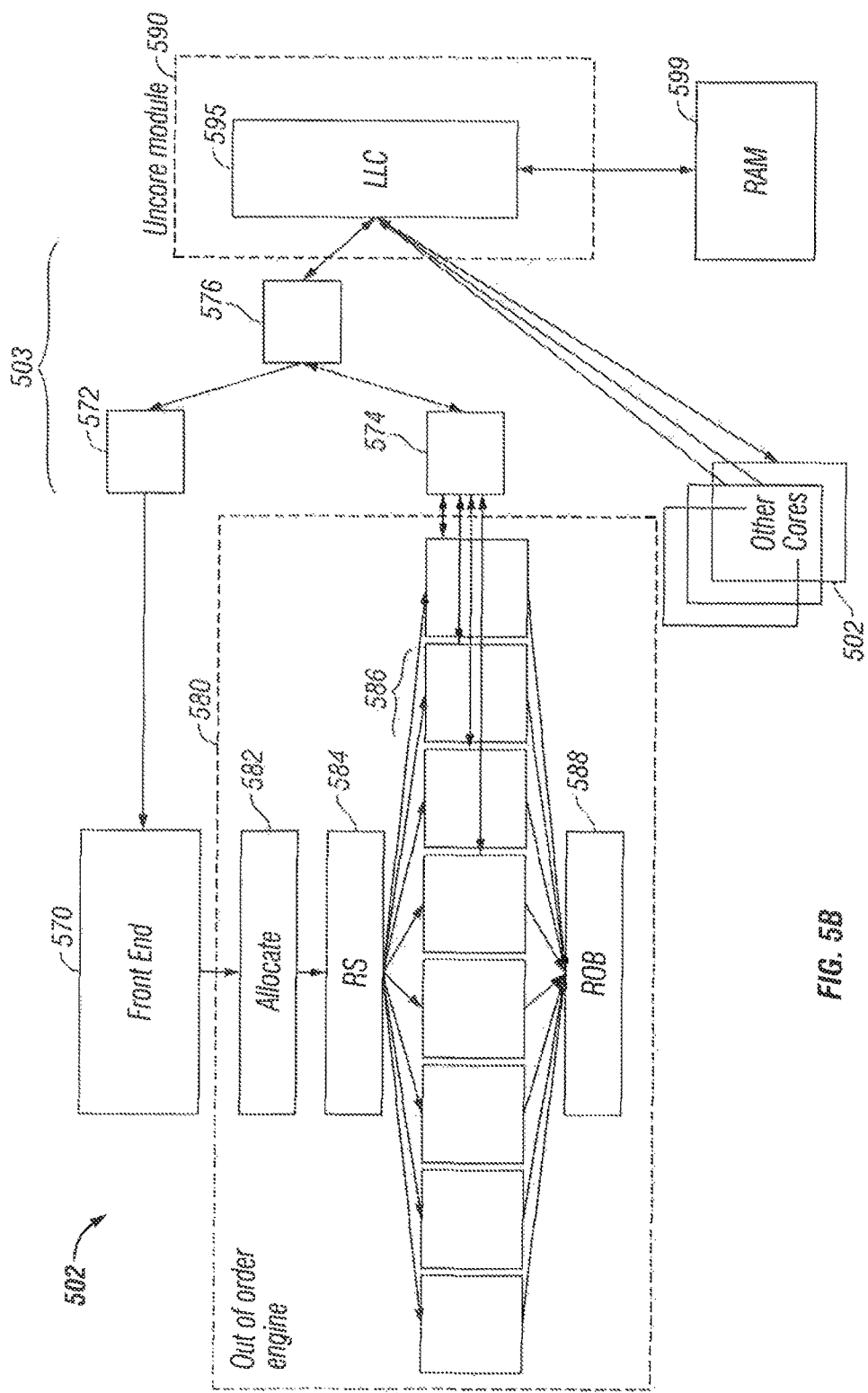
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
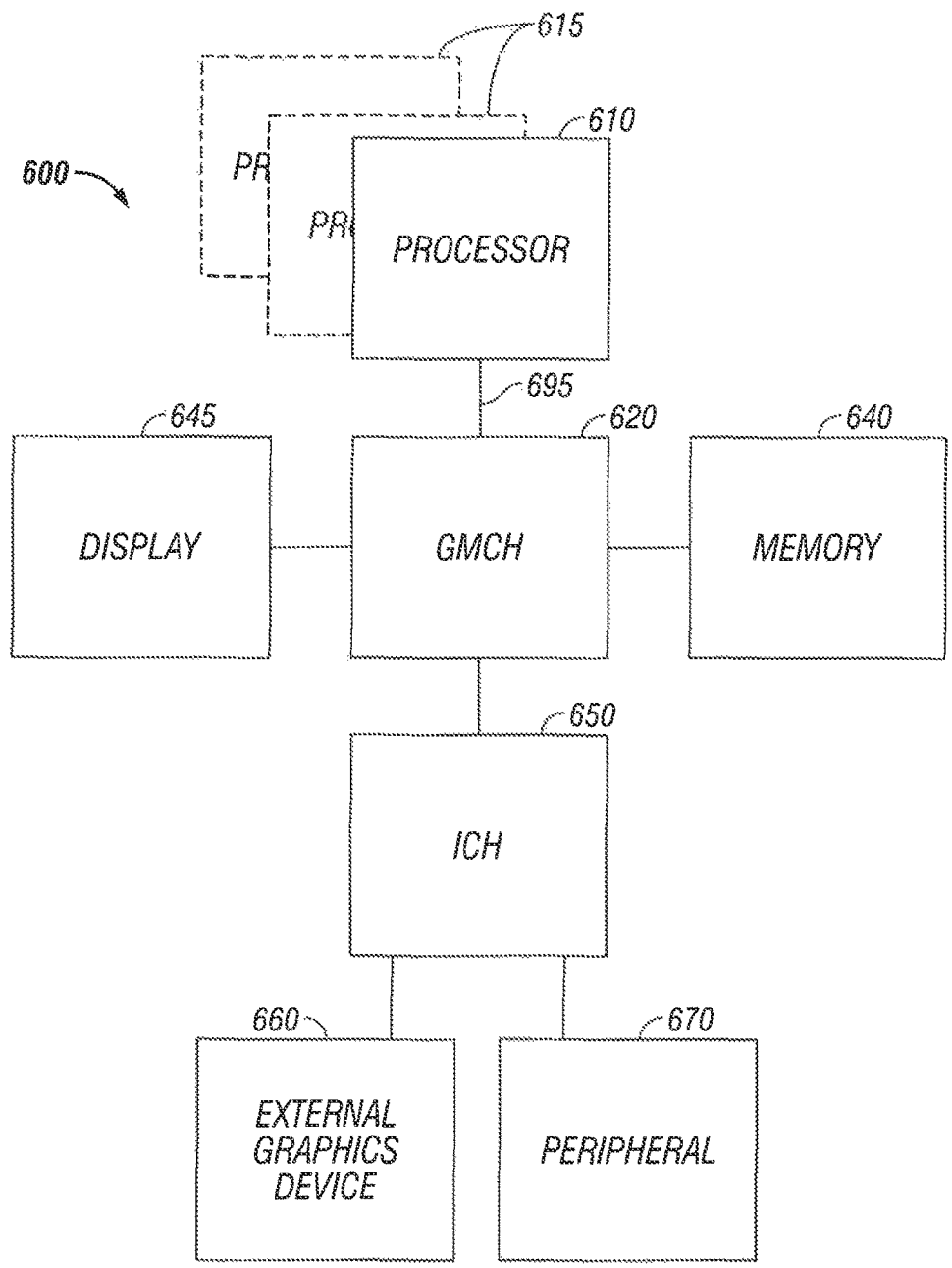
FIG. 6 is a block diagram of a system, in accordance with embodiments of the present disclosure.
Figure 7:
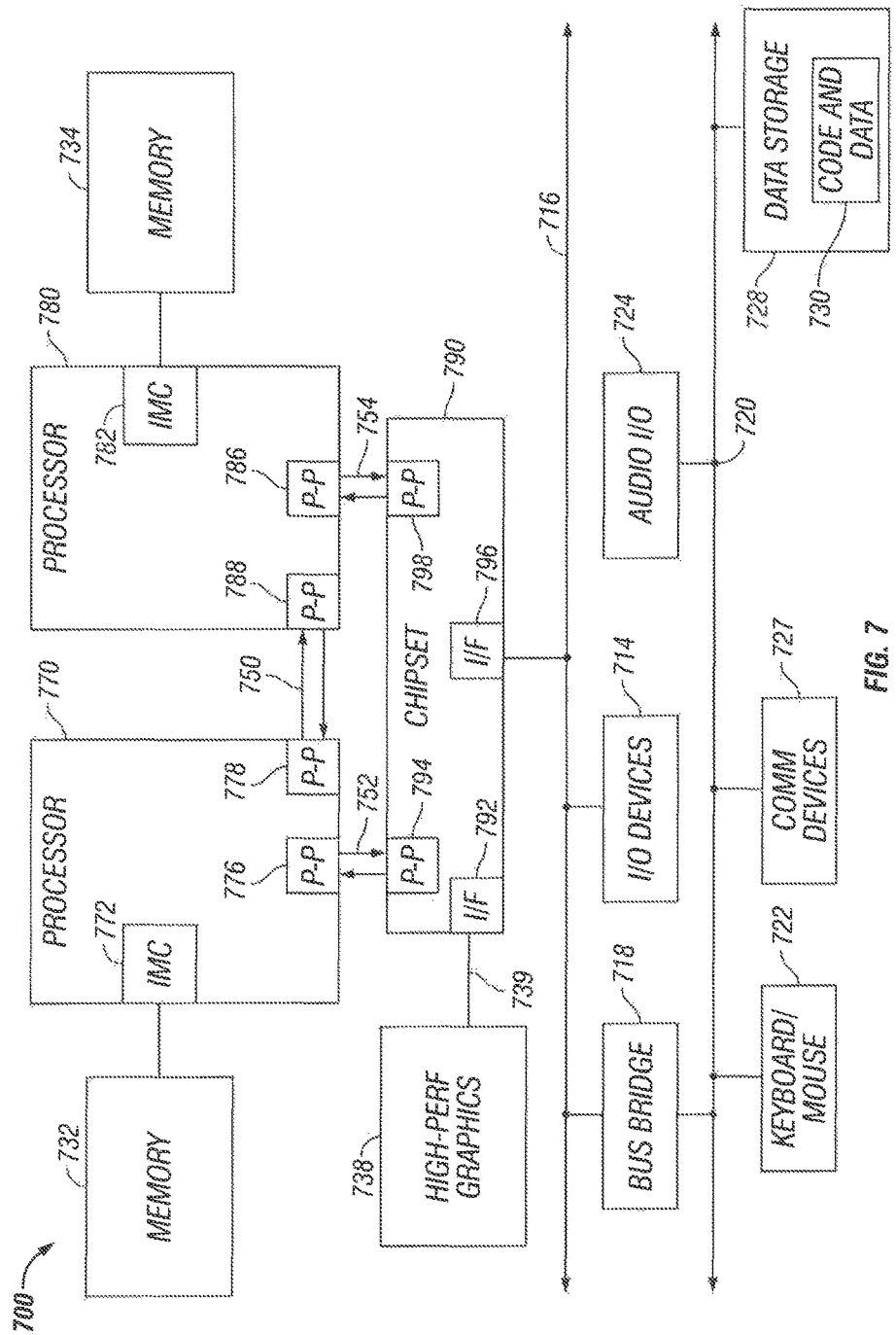
FIG. 7 is a block diagram of a second system, in accordance with embodiments of the present disclosure.
Figure 8:
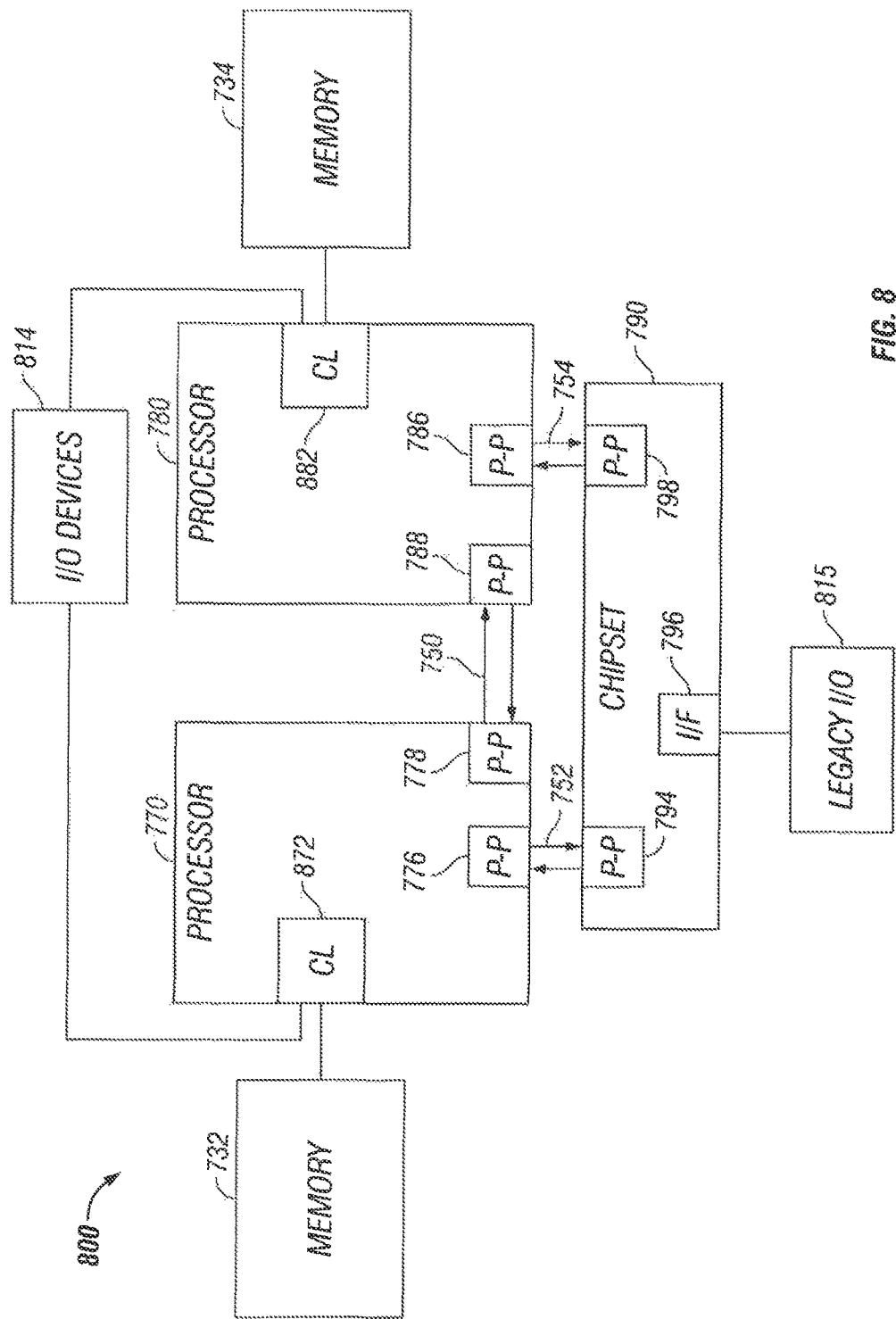
FIG. 8 is a block diagram of a third system in accordance with embodiments of the present disclosure.
Figure 9:
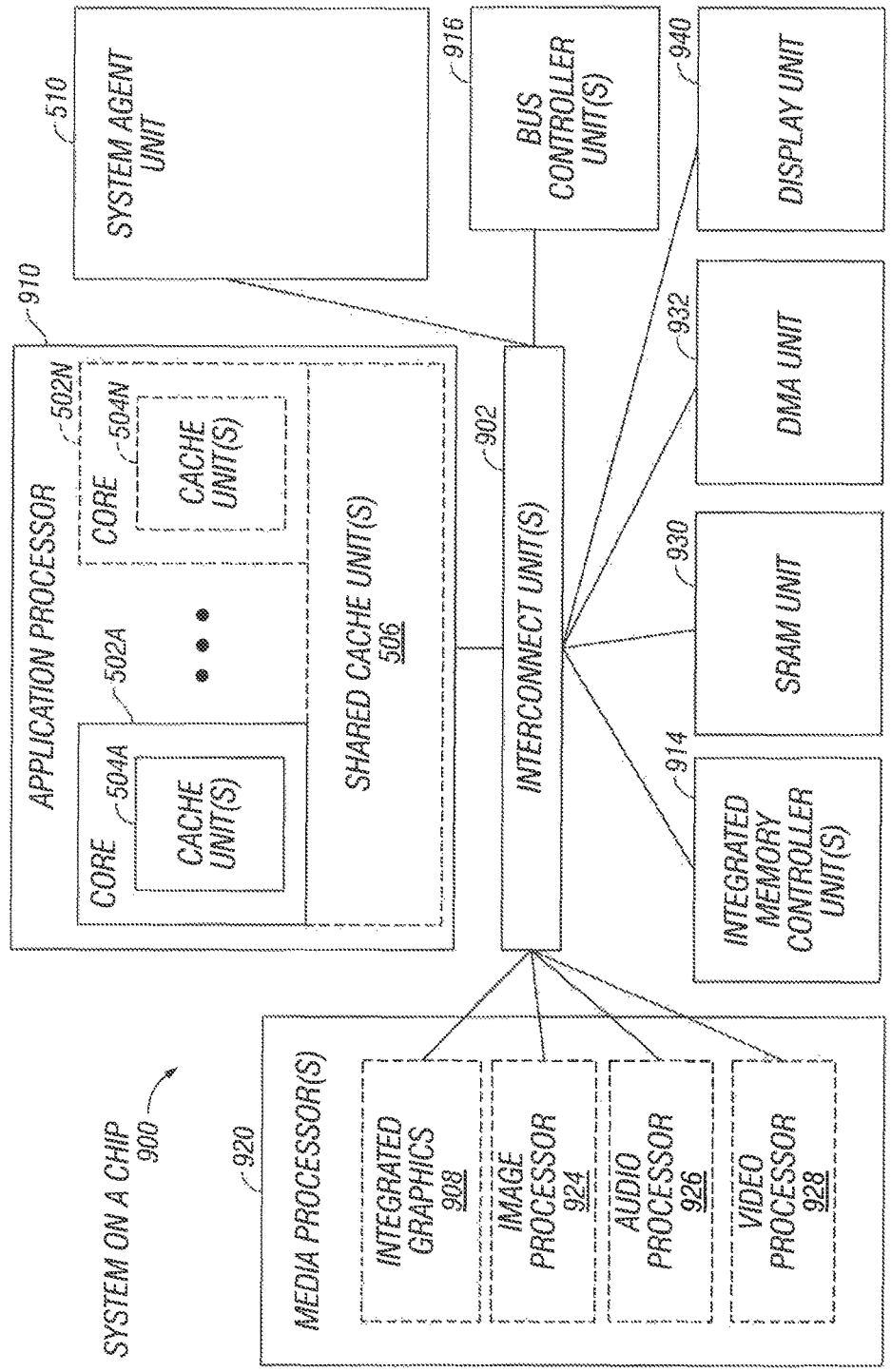
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
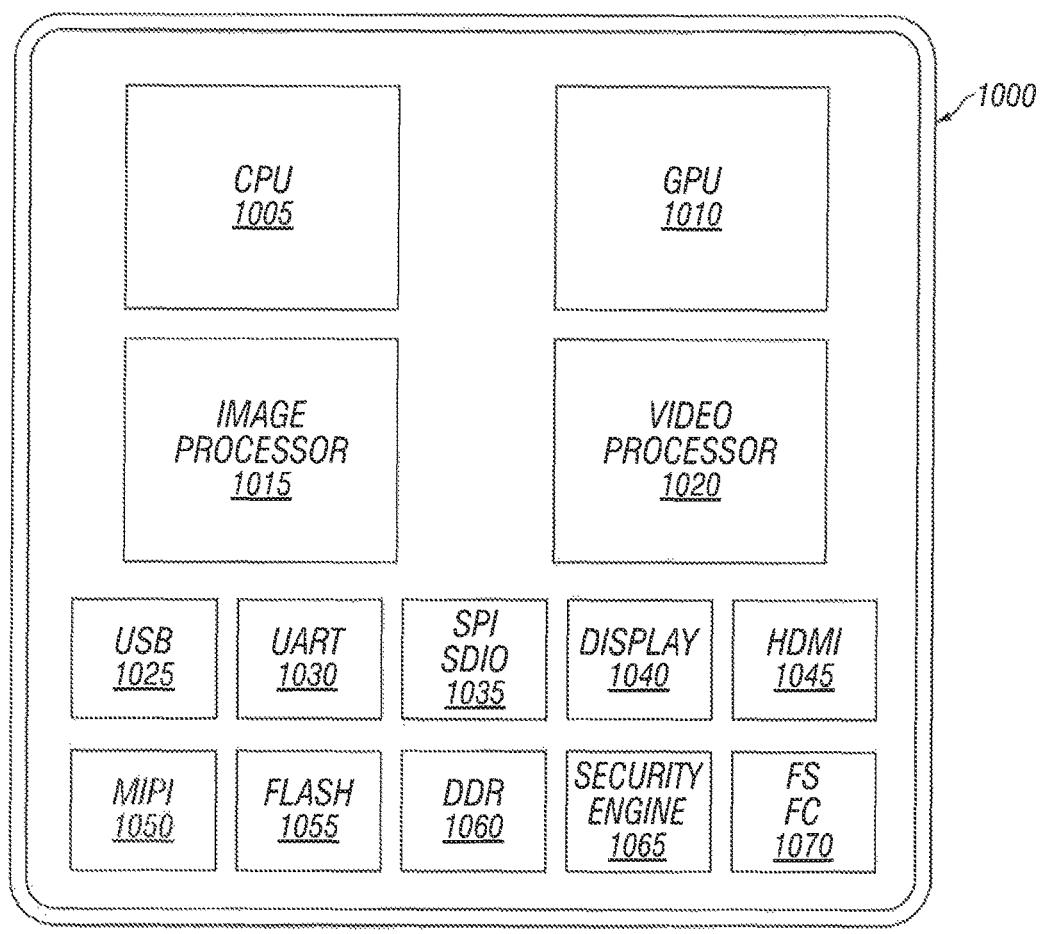
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
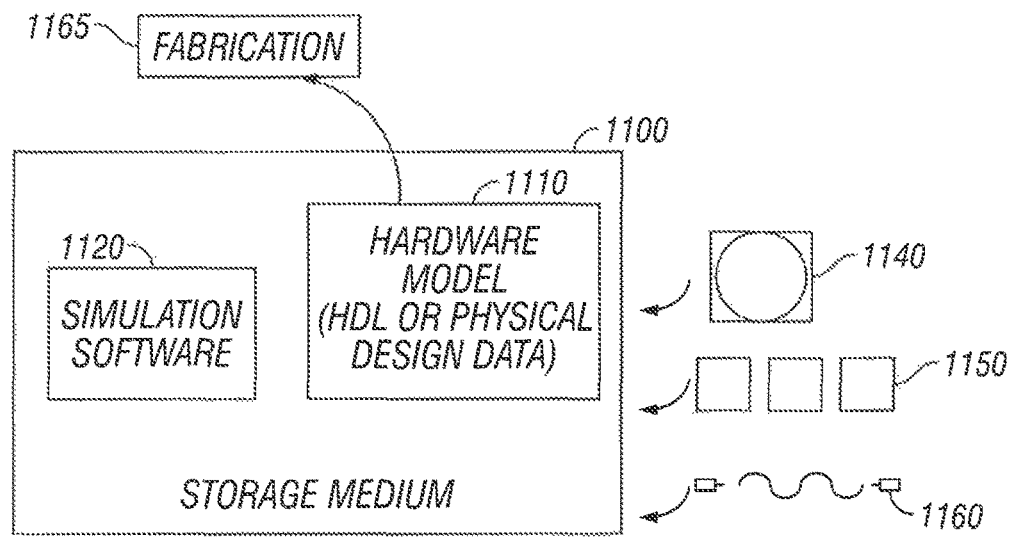
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
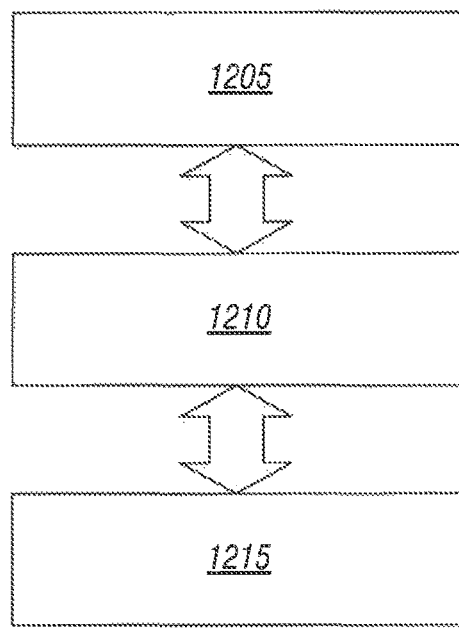
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
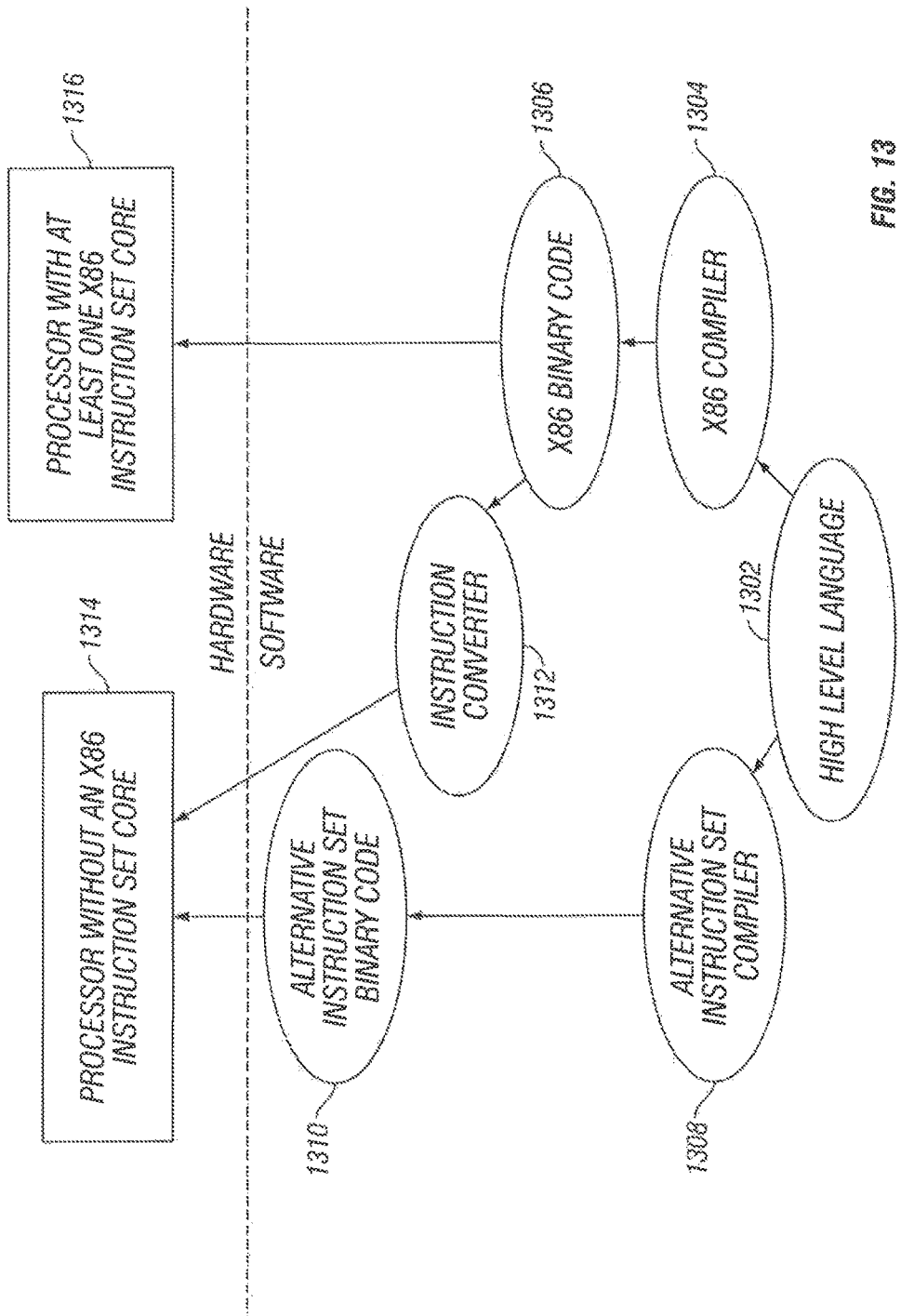
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
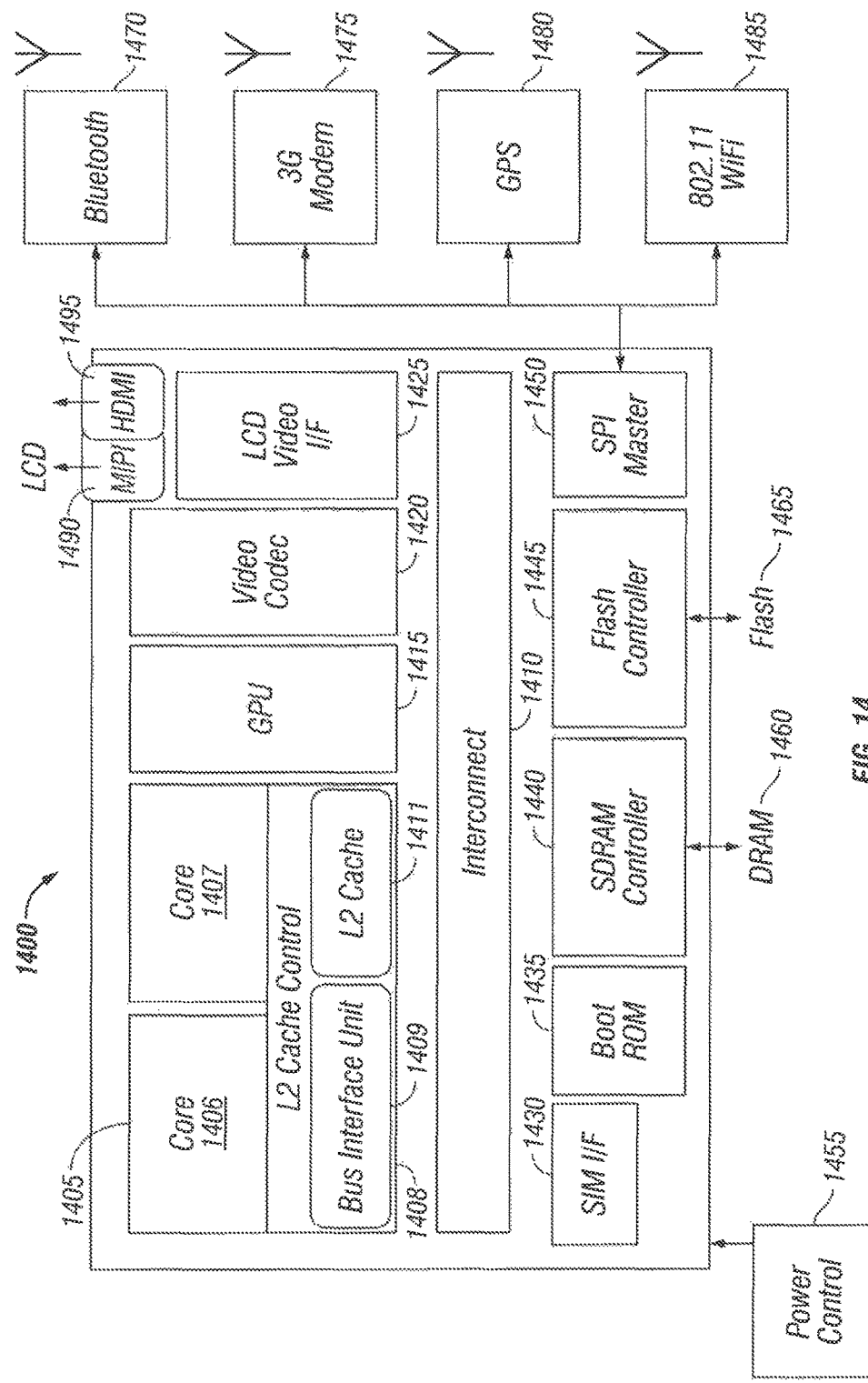
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
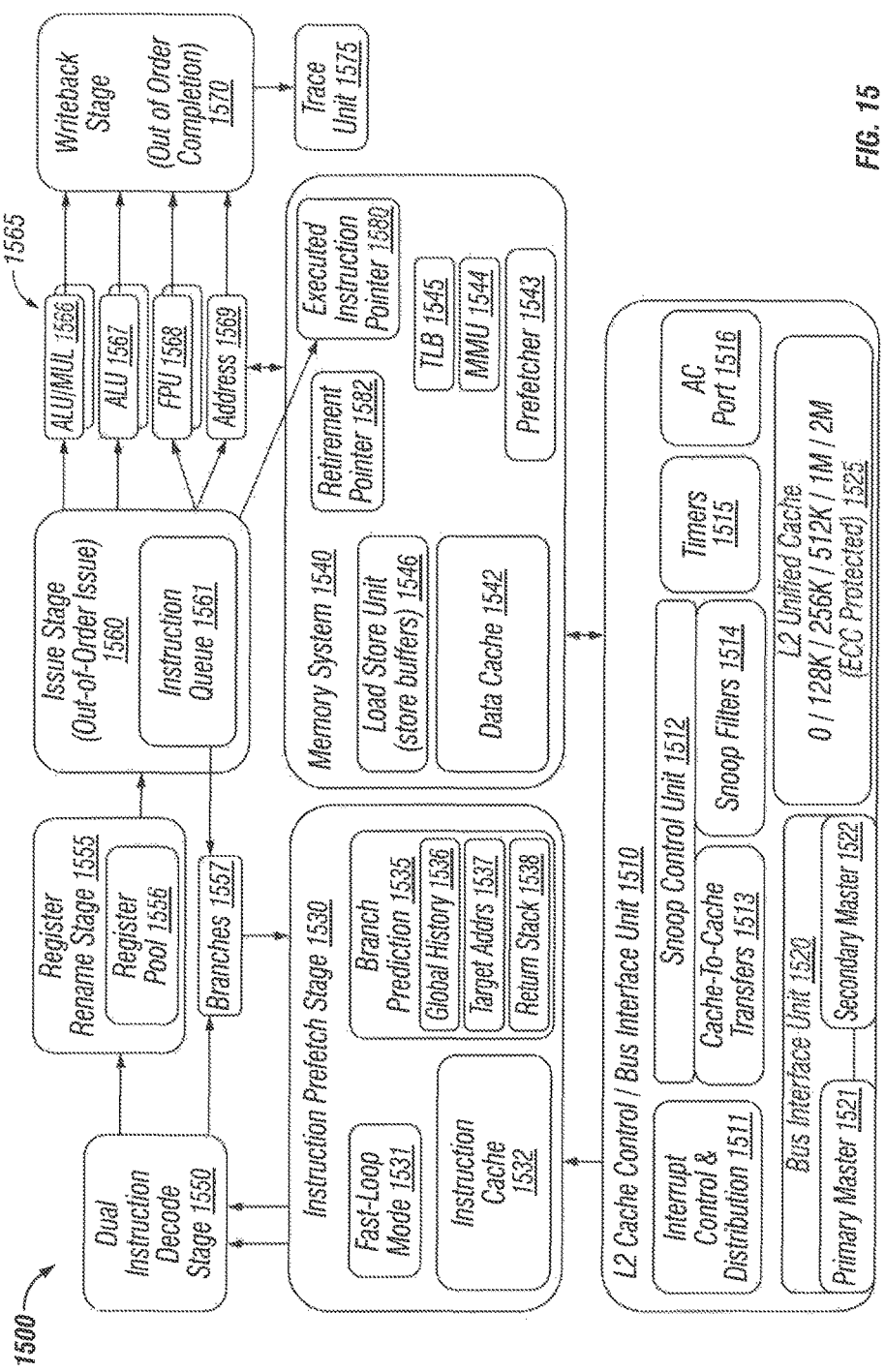
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
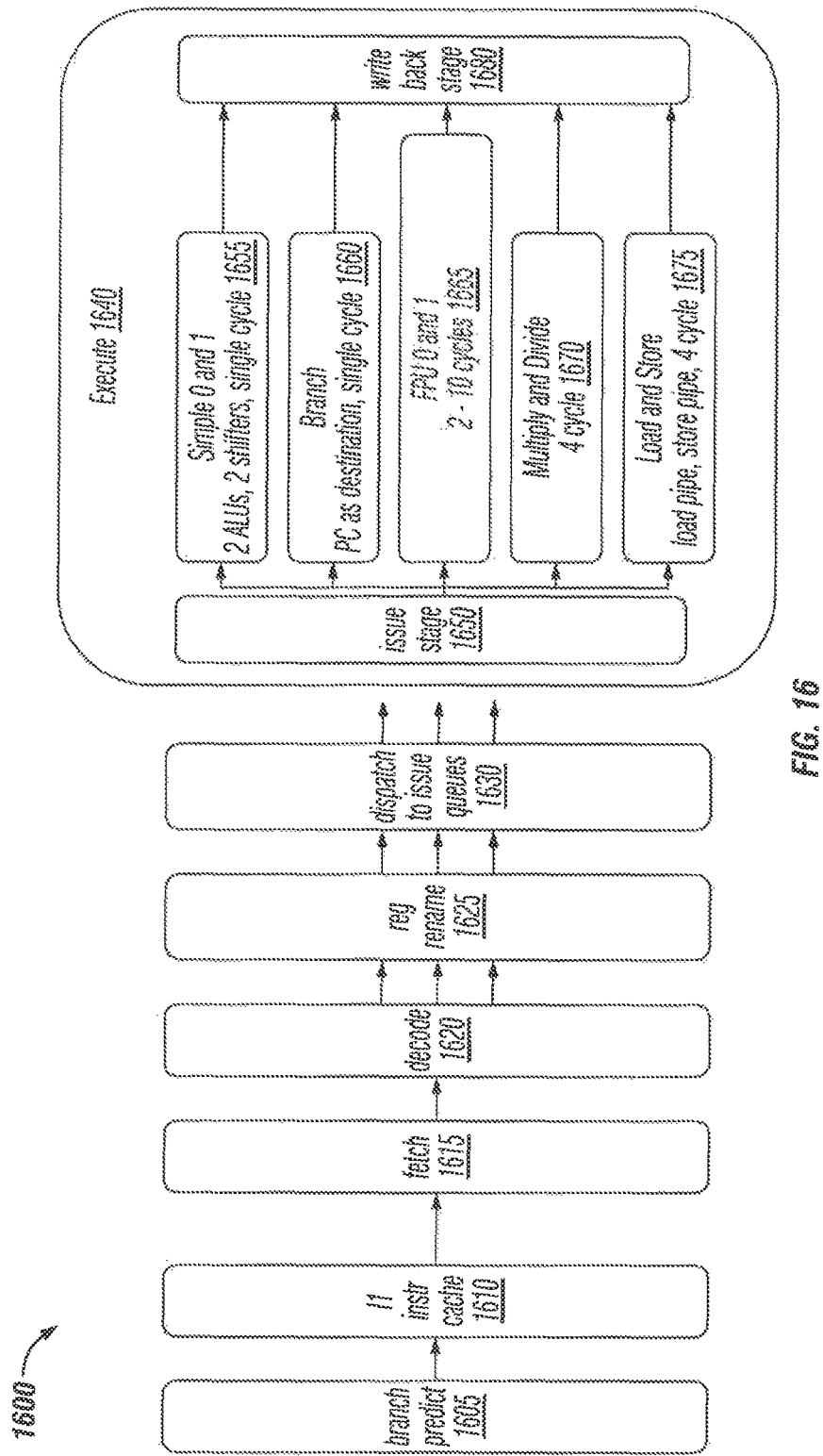
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
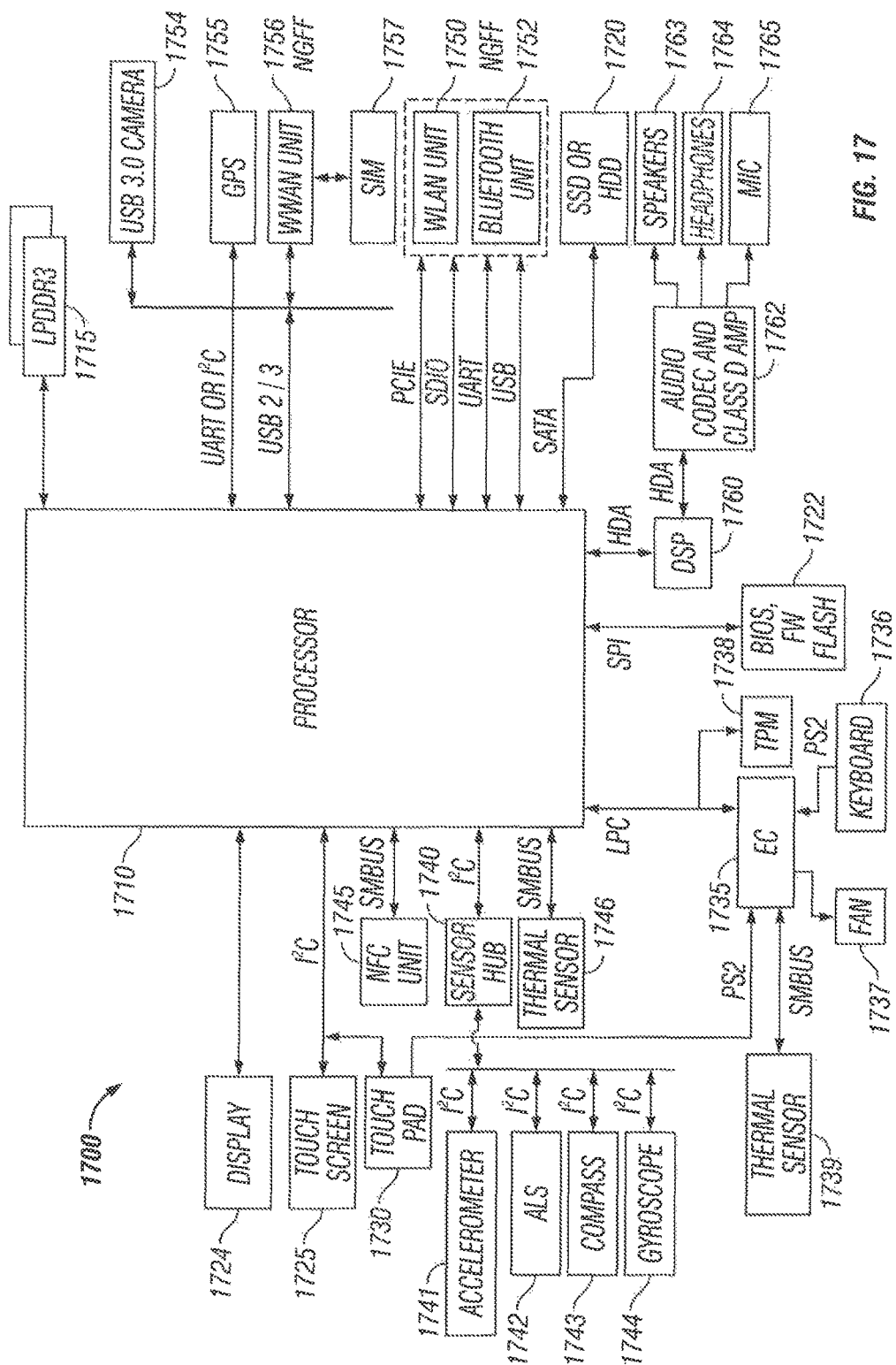
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
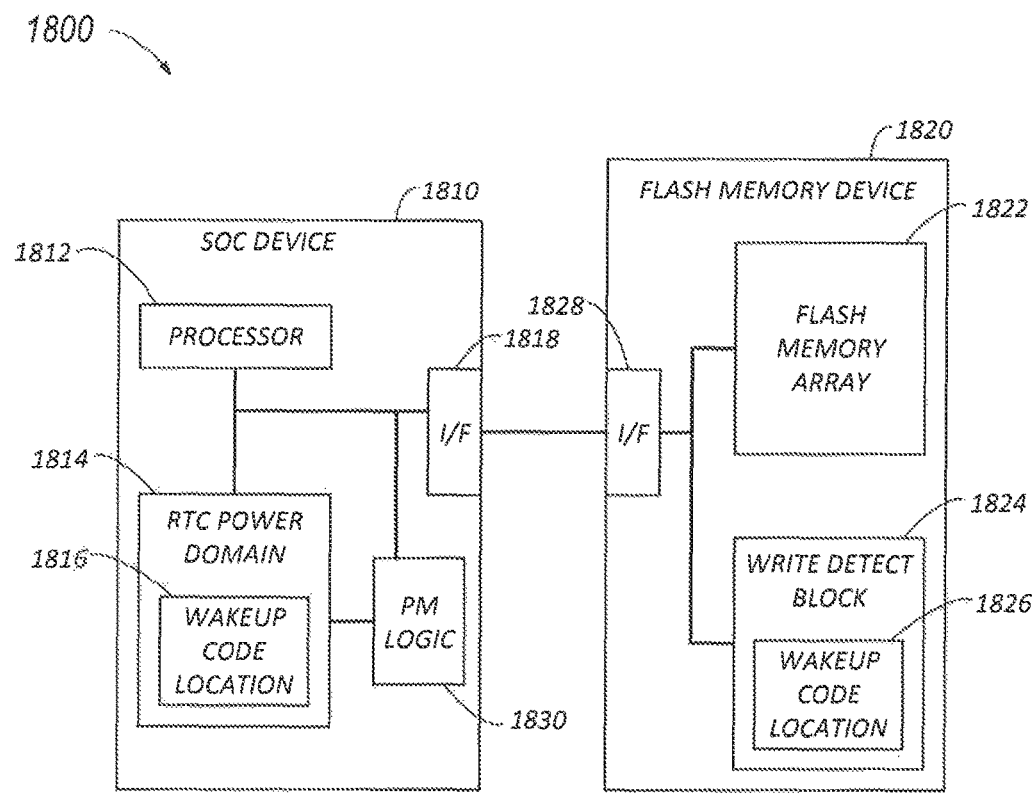
FIG. 18 is a block diagram of a system to implement an extreme deep sleep state, in accordance with embodiments of the present disclosure.

Embodiments of the present disclosure involve instructions and/or logic for entering and waking up from an extreme deep sleep state, while detecting potential tampering activity that takes place while in the extreme deep sleep state. FIG. 18 is an illustration of a system to implement an extreme deep sleep state, in accordance with embodiments of the present disclosure. More specifically, FIG. 18 illustrates a system 1800 that includes an SoC device 1810 and a flash memory device 1820. SoC device 1810 may be implemented in any suitable manner, such as fully or in part by SoC device 900 described above. Flash memory device 1820 may be implemented in any suitable manner and using any suitable flash memory technology including, but not limited to, those described above in reference to FIGS. 1-17. In other embodiments, system 1800 and/or SoC device 1810 may include greater, fewer, or different components than those illustrated in FIG. 18.

In one embodiment, SoC device 1810 may be a baseband SoC. As illustrated in FIG. 18, SoC device 1810 may include a processor 1812, a real-time-clock (RTC) power domain 1814, a wakeup code location 1816, power management (PM) logic 1830, and an interface 1818 through which SoC device 1810 communicates with flash memory device 1820. Processor 1812 may include any suitable type of processor core including, but not limited to, one or more CPUs (any of which may implement multi-threading) or GPUs, in different embodiments. Processor 1812 may be implemented in any suitable manner, such as fully or in part by one of the processors illustrated in any of FIGS. 1-17 and described above. In one embodiment, RTC power domain 1814 may represent a portion of SoC device 1810 to which power is supplied even when SoC device 1810 is in an extremely low power state, such as a powered-down state or the extreme deep sleep state described herein. In one embodiment, system 1800 may be put into an extreme deep sleep state in which all system supply rails except the RTC rail can be switched off, leaving the system in a "suspend to flash" state. System 1800 may support a fast wake-up from this extreme deep sleep state (one that does not perform a full secure boot sequence), and may provide mechanisms to determine whether or not the content of flash memory array 1822 was altered or otherwise tampered with during the extreme deep sleep state. SoC device 1810 may include storage capabilities in its on-chip RTC power domain 1814. In one embodiment, wakeup code location 1816 may be a register or other storage location within RTC power domain 1814 in which a "wakeup code" value may be stored.

In embodiments of the present disclosure, power management logic 1830 may provide all system supply rails, may handle initial system power-up tasks, and/or may handle various system shutdown tasks. For example, power management logic 1830 may include logic and components for regulating the power state of processor 1812 and other components or portions of SoC device 1810. In one embodiment, power management logic 1830 may include logic for detecting inactivity or other events or conditions under which the system should enter a low power mode. For example, power management logic 1830 may include logic for detecting inactivity or other events or conditions under which the system should enter a powered-down state, a deep sleep state, or an extreme deep sleep state. In another embodiment, power management logic 1830 may include logic for initiating the change of power state. For example, power management logic 1830 may include logic for indicating to processor 1812 that it should initiate an operation to enter a particular low power mode. In yet another example, power management logic 1830 may include logic for shutting down power to various portions of system 1800. Power management logic 1830 may include logic to receive an indication from processor 1812 that it should begin shutting down power to various portions of system 1800 as part of an operation to enter a low power mode (e.g., a powered-down state, a deep sleep state, or an extreme deep sleep state). In one embodiment, this indication from processor 1812 may be generated as part of the execution of an instruction by processor 1812. In the illustrated embodiment, power management logic 1830 is included on SoC device 1810. In another embodiment, power management logic 1830 may be implemented by (or included in) a power control unit (PCU) included in a system agent (such as system agent 510 described above) within processor 1812. As described in more detail below, SoC device 1810 may include instructions and/or logic to implement an extreme deep sleep state using any or all of the hardware features of RTC power domain 1814, power management logic 1830, and flash memory device 1820.

In FIG. 18, flash memory device 1820 may include a flash memory array 1822, a write detect block (WDB) 1824, a wakeup code location 1826, and an interface 1828 through which flash memory device 1820 communicates with SoC device 1810. For example, WDB 1824 may provide non-volatile storage capabilities (outside the flash memory array 1822) for storing a wakeup code value. In one embodiment, SoC device 1810 can write or read the WDB 1824 (including, more specifically, wakeup code location 1826) over the flash memory device interface 1828 without limitation. In one embodiment, WDB 1824 may include logic (such as hardware circuitry or other mechanisms) to clear the content stored within WDB 1824 (or, more specifically, the value stored in wakeup code location 1826) whenever a write or erase operation is performed to flash memory array 1822 of flash memory device 1820. In another embodiment, WDB 1824 may include logic (such as hardware circuitry or other mechanisms) to clear the content stored within WDB 1824 (or, more specifically, the value stored in wakeup code location 1826) upon the completion of each read operation directed to wakeup code location 1826 or, in general, to WDB 1824. In some embodiments, a given wakeup code value may be read only once after it is stored in wakeup code location 1826 within WDB 1824.

In one embodiment, wakeup code location 1826 may be a register or other storage location within flash memory device 1820 into which a wakeup code value may be stored by processor 1812. In one embodiment, WDB 1824 may include hardware circuitry and/or other logic to monitor read and write activity that is directed to flash memory device 1820. WDB 1824 may include hardware circuitry and/or other logic to detect various activities and/or conditions that may be indicative of tampering activities. For example, WDB 1824 may include logic to detect an attempt to modify or erase flash memory array 1822. In another example, WDB 1824 may include logic to detect an attempt to defeat security measures by reading the value of wakeup code location 1826. In one embodiment, in response to observing potential tampering activity, WDB 1824 may clear the value of wakeup code location 1826 by replacing it with a NULL value, such as all zeros. In another embodiment, in response to observing potential tampering activity, WDB 1824 may replace the value of wakeup code location 1826 with another reserved value that indicates the type of potential tampering activity that was observed.

Note that, while the system illustrated in FIG. 18 includes an SoC device 1810 that itself includes a processor 1812, an RTC power domain 1814, and power management logic 1830, in another embodiment, one or more of these components may be included on a separate integrated circuit device (chip) within system 1800. In still other embodiments, the functionality of the components illustrated in FIG. 18 may be partitioned differently between processor 1812 and other logic on a single chip or on multiple chips. For example, in one embodiment, power management logic 1830 may be implemented on a separate chip (e.g., a Power Management Integrated Circuit, or PMIC) on the same printed circuit board as SoC device 1810, rather than being included within SoC device 1810. In another embodiment, power management logic 1830 may be implemented on a separate chip (e.g., a Power Management Integrated Circuit, or PMIC) on another printed circuit board within system 1800. In yet another embodiment, power management logic 1830 may be implemented as a separate chip (PMIC) within the same package as SoC device 1810. In another embodiment, power management logic 1830 may be implemented as a separate circuit integrated on the same die as SoC device 1810. In at least some embodiments, flash memory device 1820 may be included on the same printed circuit board as SoC device 1810 within system 1800.

In some embodiments, the processors and systems described herein may include instructions and/or logic to implement one or more types of low power modes and corresponding wake-up mechanisms. For example, system 1800, SoC device 1810, and processor 1812 may implement one type of low power mode that is associated with power-down/power-up sequences, as well as with system restart or system reset sequences. This first type of low power mode may sometimes be referred to as a "powered-down" state. In some embodiments, entry into this first type of low power mode may be triggered by a mechanical mechanism (e.g., in response to a power or reset button being pressed). In other embodiments, entry into the powered-down state may be triggered by power management logic 1830 (e.g., in response to detecting a condition or event that prompts power management logic 1830 to power down, restart, or reset the system) or by other mechanisms that initiate actions to enter this type of low power mode. This may include, in one embodiment, execution of an instruction that initiates a power-down, restart, or reset of system 1800, SoC device 1810, or processor 1812. In another embodiment, entry into the powered-down state may be triggered by the detection of user input that initiates a power-down, restart, or a reset of the system (e.g., through selection of a menu item, soft key, or other graphical user interface mechanism).

In one embodiment, entering this first type of low power mode may include saving a minimal amount of state, instructions, and/or data (e.g., state, instructions, and/or data to be used in beginning or resuming operation when powering up or restarting) to a non-volatile memory (such as flash memory device 1820) and then powering down most of system 1800. In other embodiments, entering this first type of low power mode may not include saving state or context information. In some embodiments, power supply rails that provide power to power domains other than real-time-clock (RTC) power domain 1814 may be switched off when the system enters this type of low power mode, resulting in minimal current consumption. RTC power domain 1814 may include a very small portion of the device that remains powered on as long as a battery is still connected. In one embodiment, RTC power domain 1814 may be the only portion of the device that remains powered by the battery when the device is in this first type of low power mode. In some embodiments, RTC power domain 1814 may include a real-time clock circuit that keeps track of the current time. A real-time clock circuit may implement an alarm mechanism to wake up the system at a particular time or after an predetermined time interval has passed. In other embodiments, a real-time clock circuit may implement other timing functions.

In one embodiment, entering the powered-down state may leave system 1800 in a state in which it has only very limited functionality, and from which it wakes up by restarting from the non-volatile memory (flash memory device 1820). For security reasons (e.g., in order to determine whether the system has been tampered with or the contents of the flash memory have been modified, or to detect and/or recover from other suspicious or malicious activity that may have taken place while the system or processor was largely powered down), when the system wakes up from this type of low power mode, the wake-up mechanism may include executing a relatively lengthy secure boot sequence. The secure boot sequence may include one or more validation and/or authorization operations. For example, the secure boot sequence may, among other things, perform cryptographic checks to validate the signatures of firmware drivers, operating system software, application software, or other sequences of instructions stored in various memories in the system to ensure that only trusted software (e.g., software that has not been modified while the system was powered down) is presented to the processor once the secure boot sequence is complete. While the secure boot sequence may take quite a long time to complete (e.g., on the order of a few seconds, in some embodiments) and therefore may contribute to current consumption, this secure boot sequence may primarily be employed in the case of power-up (during which the additional start-up time may not be an issue), as the restart and reset cases might occur relatively infrequently compared to the power-up case.

In some embodiments, the processors and systems described herein may include instructions and/or logic to implement another type of low power mode that is sometimes referred to as a "deep sleep" state. For example, in one embodiment, in response to the detection of system inactivity by power management logic 1830, system 1800 may enter a low power state in order to reduce current consumption. In another embodiment, system 1800 may enter a low power state in response to the execution by processor 1812 of an instruction that initiates entry into a deep sleep state. In some embodiments, when system 1800 (including, for example, SoC device 1810) and its processor(s) 1812 are this deep sleep state, some power domains (or portions thereof) may be maintained in the system while power may be switched off in other power domains. In one embodiment, power may be supplied to RTC power domain 1814 while the device is in the deep sleep state. In another embodiment, power may be supplied to one or more power domains other than RTC power domain 1814 while the device is in the deep sleep state. In one embodiment, power supply rails may be maintained for at least some portion of internal RAM (RAM that is internal to processor 1812 or that is included on the same SoC device 1810 as processor 1812) while SoC device 1810 is in the deep sleep state. Other portions of internal RAM may be powered down while SoC device 1810 is in the deep sleep state, in some embodiments. In another embodiment, power supply rails may be maintained for at least some portion of external SDRAM (SDRAM that is included on a device other than SoC device 1810 on the same printed circuit board as SoC device 1810 or on another printed circuit board in system 1800) while SoC device 1810 is in the deep sleep state. In yet another embodiment, power supply rails may be maintained for one or more components of system 1800 other than memory components. In some embodiments, the context information (such as state, instructions, and/or data) that was resident in the internal RAM and/or external SDRAM prior to entering the deep sleep state, and that is maintained therein during the deep sleep phase, may be sufficient to allow system 1800 to resume operation upon waking up from the deep sleep state.

In some embodiments, the mechanism for waking up from a deep sleep state may include restarting from the internal RAM or external SDRAM, the contents of which are retained during deep sleep phases. The wake-up mechanism for this deep sleep mode may or may not include any specific security measures, as it may be unlikely that an attempt to tamper with the contents of an internal RAM included in the processor or in an SoC device and/or to tamper with the contents of an external SDRAM device will take place while the power is maintained on these devices. For example, rather than executing a lengthy secure boot sequence, the wake-up mechanism for the deep sleep state may include branching to a system wakeup sequence (which may be saved in the internal RAM or external SDRAM) and continuing execution at essentially the point at which execution stopped before the system entered the deep sleep mode.

For certain kinds of embedded battery-powered devices, such as standalone modem modules, mobile phones, wearable devices, or Internet of Things (IoT) devices, current consumption may be an important consideration. In one example, some "µW modems" may have standby power consumption on the order of a few µW. These types of devices may be designed to minimize power consumption and/or to have a long battery lifetime. In some embodiments of the present disclosure, a system 1800 that implements such a device may include instructions and/or logic to implement yet another type of low power mode, which is referred to herein as an "extreme deep sleep" state, and a corresponding wake-up mechanism for the extreme deep sleep state. In one embodiment, in response to the detection of system inactivity by power management logic 1830, system 1800 may enter the extreme deep sleep state in order to greatly reduce current consumption. In another embodiment, system 1800 may enter the extreme deep sleep state in response to the execution by processor 1812 of an instruction that initiates entry into the extreme deep sleep state.

In one embodiment, entering the extreme deep sleep state may include saving at least some state, instructions, and/or data (e.g., enough state, instructions, and/or data to be able to begin or resume operation upon waking up from the extreme deep sleep state) to non-volatile memory (e.g., to flash memory array 1822 within flash memory device 1820) and powering down most of system 1800. For example, in some embodiments, power supply rails that provide power to power domains other than a real-time-clock (RTC) power domain 1814 may be switched off when system 1800 enters the extreme deep sleep state, resulting in minimal current consumption. In one embodiment, RTC power domain 1814 may be the only portion of SoC device 1810 that remains powered by the battery when the device is in the extreme deep sleep state. Entering the extreme deep sleep state may leave system 1800 in a state in which it has only very limited functionality, and from which it wakes up by restarting from the non-volatile memory (flash memory device 1820).

The scenarios under which an embedded battery-powered device enters the extreme deep sleep state may be more numerous and/or may occur more often than the device is powered down and back up or restarted. In one embodiment, in order to preserve battery life, a device may enter the extreme deep sleep state after even brief periods of inactivity. These use cases may occur frequently during normal operation and not just in exceptional cases. In one embodiment, the threshold for the period of inactivity that triggers entry into the extreme deep sleep state may be configurable. In another embodiment, entry into the extreme deep sleep state may be explicitly triggered by applications executing on the devices and/or by user input. The wake-up mechanism for the extreme deep sleep state may, in some embodiments, allow the system to resume operation quickly and securely, without having to execute a full secure boot sequence such as that initiated upon power-up, restart, or reset. The wake-up mechanism for the extreme deep sleep state may allow the system to resume more quickly than is possible when waking up from the powered-down state (such as upon power-up, restart, or reset) without compromising security.

In some embodiments, the systems described herein may include security mechanisms to ensure that any modifications to the non-volatile memory in which state, instructions, and/or data were saved prior to entering an extreme deep sleep state (e.g., flash memory device 1820) that take place while the system is in the extreme deep sleep state are detected. These security mechanisms may include a write detect block 1824 (which may be implemented using hardware circuitry and/or other logic) in flash memory device 1820, as well as security mechanisms on an SoC device 1810. In one embodiment, write detect block (WDB) 1824 may have certain properties not typically found in flash memory devices. For example, WDB 1824 may include a dedicated register or other storage location (such as a register or storage location outside of flash memory array 1822) for storing a wakeup code value that may be read by the wake-up mechanism associated with the extreme deep sleep mode.

In some embodiments, WDB 1824 may also include logic for clearing the value stored in wakeup code location 1826 or replacing it with a reserved value, under certain conditions. In one embodiment, the value stored in wakeup code location 1826 may be cleared or replaced when certain accesses are made (or attempted) to the flash memory array 1822 of the flash memory device 1820. For example, WDB 1824 may include logic to detect any attempt to perform a write or erase operation that targets the flash memory array 1822 as a potential tampering activity (e.g., as an attempt to manipulate the contents of flash memory array 1822 while system 1800 is in the extreme deep sleep state). In response to detecting such an attempt, WDB 1824 may clear the value stored in wakeup code location 1826 or may replace it with a reserved value. In some embodiments, in order to prevent a malicious process from discovering and subsequently using the wakeup code, WDB 1824 may clear the value stored in wakeup code location 1826 (or replace it with a reserved value) after the first read access to wakeup code location 1826. The wakeup code value may be a random number or a pseudorandom number (or another locally or temporally unique value that was generated for the most recent extreme deep sleep phase) that was also stored on SoC device 1810 in system 1800 prior to entering the extreme deep sleep state.

In some embodiments, entering the extreme deep sleep state may include generating (on SoC device 1810) a locally or temporally unique value to serve as the wakeup code value. For example, in one embodiment, entering the extreme deep sleep state may include processor 1812 generating a random or pseudorandom number to serve as the wakeup code value. Entering the extreme deep sleep state may include storing this wakeup code value in the dedicated wakeup code location 1826 within the WDB on the flash memory device and also in the dedicated storage location (wakeup code location 1816) within the RTC power domain of the SoC device. Upon waking up from the extreme deep sleep state, the wake-up mechanism may invoke a security mechanism on SoC device 1810 to determine whether or not the wakeup code value stored in the WDB 1824 still matches the wakeup code value stored on SoC device 1810. If not, this may indicate to SoC device 1810 that an attempt was made to tamper with flash memory device 1820 (e.g., to modify the contents of flash memory array 1822 or to read the value of wakeup code location 1826) while the system was in the extreme deep sleep state. In this case, SoC device 1810 may implement an error or exception handling mechanism, which may include performing a full secure boot sequence, restarting the system, or shutting down the system. If the wakeup code value stored in the WDB 1824 still matches the wakeup code value stored on SoC device 1810, this may indicate that no attempts were made to modify the contents of flash memory array 1822 or to read the value of wakeup code location 1826 while the device was in the extreme deep sleep state. In this case, the system may safely continue the wake-up sequence in order to resume operation without performing a full secure boot sequence.

As described herein, the security mechanisms implemented by flash memory device 1820 and SoC device 1810 may support the use of the extreme deep sleep state (with minimal current consumption) without compromising security. In some embodiments, system 1800 may implement both a deep sleep mode and an extreme deep sleep mode, in addition to a low power mode (a powered-down state) that is associated with power-down/power-up sequences, system restart sequences, and/or system reset sequences. In other embodiments, system 1800 may implement an extreme deep sleep mode instead of a deep sleep mode, thus supporting two different low power modes, rather than three. In general, the extreme deep sleep mode described herein may be one of any number of full power and/or low power modes implemented by instructions and/or logic in system 1800 and/or the processors 1812 included therein. Some of the differences between these low power modes are summarized in Table 1 below, according to embodiments of the present disclosure.

TABLE 1

Comparison of Low Power Modes

| low power (LP) state | entering LP state | while in LP state | upon exiting LP state |
|---|---|---|---|
| powered-down | save a minimal amount of state, instructions, and/or data to non-volatile memory to be used when resuming operation later (optional), then power down the majority of the device | only the RTC power domain remains powered on (and only while a battery is connected) | restart device from non-volatile memory, resume operation upon successful completion of a full secure boot sequence |
| deep sleep | power down one or more power domains to save current consumption | the RTC power domain, and at least some portions of internal RAM, and/or external SDRAM remain powered on and retain their contents | restart device from internal RAM or external SDRAM, execute system wakeup sequence, resume operation at the point at which deep sleep state was entered |
| extreme deep sleep | save a wakeup code value to dedicated locations in the RTC power domain and in non-volatile memory, then power down the majority of the device | only the RTC power domain remains powered on (and only while a battery is connected) | restart device from non-volatile memory, examine values in wakeup code locations, initiate a full secure boot sequence if they do not match, otherwise resume operation without executing full secure boot sequence |

In some embodiments, an SoC device 1810 (e.g., a baseband SoC or another type of SoC device) and/or a processor 1812 included on an SoC device 1810 may implement security mechanisms that take advantage of corresponding security mechanisms implemented by a non-volatile memory device (such as flash memory device 1820) in system 1800. For example, processor 1812 may include logic or instructions that access wakeup code location 1826 within write detect block 1824 on flash memory device 1820 as part of sequence to enter an extreme deep sleep state. In another example, processor 1812 may include logic or instructions that access wakeup code location 1826 within write detect block 1824 on flash memory device 1820 as part of sequence to resume operation upon waking up from an extreme deep sleep state. In one embodiment, processor 1812 may also include logic or instructions that initiate actions to be taken by power management logic 1830 within processor 1812 or SoC device 1810. In another embodiment, processor 1812 may also include logic or instructions that take actions in response to receiving signals or data from power management logic 1830 indicating that a condition or event has been detected that triggers a change in the power state of system 1800, SoC device 1810, and/or processor 1812 (such as a change to a low power mode).

In one embodiment, in preparation for entering an extreme deep sleep state, processor 1812 may update the contents of flash memory device 1820 (or, more specifically, the contents of flash memory array 1822 within flash memory device 1820), which may include saving state, instructions, and/or data to flash memory array 1822 that may be used during a subsequent wake-up operation to resume operation. In one embodiment, because the contents of the internal RAM and external SDRAM will not be retained while system 1800 is in the extreme deep sleep state (because power management logic 1830 will shut down all power rails except for those in RTC power domain 1814), processor 1812 may save the complete context that will be needed to resume operation at wake-up to flash memory device 1820. Processor 1812 may include logic and/or instructions for generating a random number (or, more generally, a locally or temporally unique value) to be used as the wakeup code value for the upcoming extreme deep sleep state. In one embodiment, processor 1812 may include logic and/or instructions for storing this wakeup code value in the on-chip RTC power domain 1814 of SoC device 1810 (such as in a dedicated register or other wakeup code location 1816) and for writing the same wakeup code value to a wakeup code location 1826 within the WDB 1824 on flash memory device 1820. In one embodiment, processor 1812 may include logic and/or instructions for triggering power management logic 1830 to enter the extreme deep sleep state, in which power is shut down in most of system 1800 while RTC power domain 1814 remains powered on.

In some embodiments, power management logic 1830 may detect a wake-up event and may power up system 1800. For example, a wake-up from an extreme deep sleep state may be triggered by a real-time-clock (RTC) alarm, or by a sensor event (e.g., by detecting user input through a mechanical input mechanism). In other embodiments, power management logic 1830 may detect and respond to power-on events (e.g., those triggered by the depression of a power push-button) in addition to detecting and responding to wake-up events. Upon detection of a wake-up event or a power-on event, power management logic 1830 may power up SoC device 1810, after which a processor 1812 on SoC device 1810 (such as a main processor core on SoC device 1810) may execute a portion of its boot ROM code. In one embodiment, processor 1812 may (e.g., by executing the boot ROM code) retrieve information from power management logic 1830 about the recently detected event. This information may indicate whether the detected event was a wake-up from the extreme deep sleep state or a power-on event. In the case of a power-on event, processor 1812 may initiate the performance of a full secure boot sequence. Otherwise, in the case of a wake-up from the extreme deep sleep state, processor 1812 may initiate a wake-up sequence that is associated with waking up from the extreme deep sleep state.

In support of this wake-up sequence, processor 1812 may include logic and/or instructions for reading the wakeup code value from wakeup code location 1826 within WDB 1824 of flash memory device 1820 and for retrieving the wakeup code value that is stored in wakeup code location 1816 within RTC power domain 1814 of SoC device 1810. In one embodiment, processor 1812 may include logic and/or instructions for determining whether or not these wakeup code values match. If not, this may indicate that there has been an attempt to modify the contents of flash memory array 1822 while system 1800 was in the extreme deep sleep state. Processor 1812 may include logic and/or instructions for initiating an error or exception handling sequence, in this case, which may result in performing a standard full secure boot (or reboot) sequence, a restart of system 1800, or a shutdown of system 1800. Processor 1812 may include logic and/or instructions for continuing to perform the wake-up sequence from the flash memory device 1820, in case of matching wakeup code values. In this case, processor 1812 might not perform a full secure boot sequence, and system 1800 may resume operation at an entry point that is dependent on the context that was stored on flash memory device 1820 before entering the extreme deep sleep state.

Figure 19:
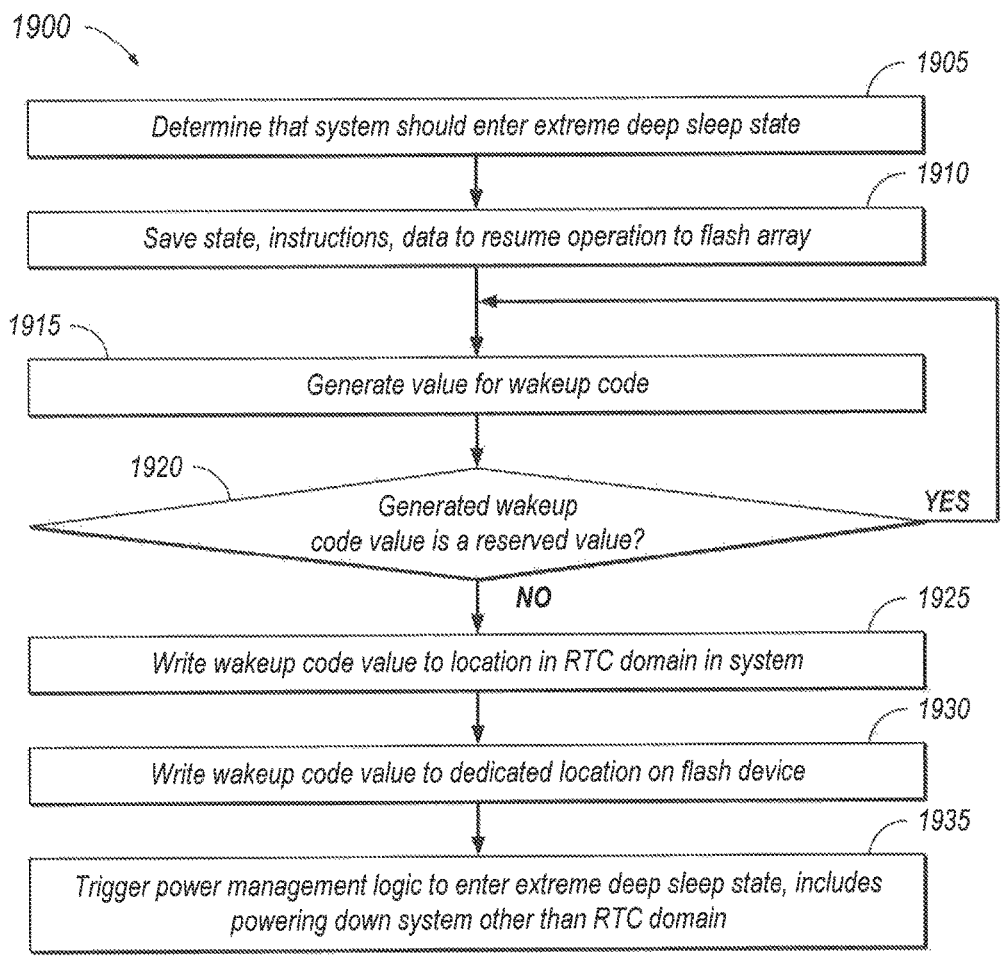
FIG. 19 is an illustration of a method for entering an extreme deep sleep state, according to embodiments of the present disclosure.

FIG. 19 is an illustration of a method 1900 for entering an extreme deep sleep state, according to embodiments of the present disclosure. Method 1900 may be implemented by any of the elements shown in FIGS. 1-18. Method 1900 may be initiated by any suitable criteria and may initiate operation at any suitable point. In one embodiment, method 1900 may initiate operation at 1905. Method 1900 may include greater or fewer steps than those illustrated. Moreover, method 1900 may execute its steps in an order different than those illustrated below. Method 1900 may terminate at any suitable step. Moreover, method 1900 may repeat operation at any suitable step. Method 1900 may perform any of its steps in parallel with other steps of method 1900, or in other methods. Furthermore, method 1900 may be executed multiple times to enter an extreme deep sleep state at different times during the operation of a system, as appropriate.

At step 1905, in one embodiment, it may be determined that a system should enter an extreme deep sleep state. For example, a processor (such as any of the processors described above) or other logic within an SoC device may execute an instruction that initiates an operation to enter an extreme deep sleep state. In another example, power management logic, or a power control unit (PCU) within a system agent on the processor, may detect inactivity or another event or condition under which the system should enter an extreme deep sleep state, and may provide an indication to the processor to that effect. In response, the processor may perform (or initiate the performance of) any or all of steps 1910-1935. At 1910, any state, instructions, and/or data to be used in resuming operation following a subsequent wake-up from the extreme deep sleep state may be saved to a flash memory array of a flash memory device.

At 1915, prior to entering the extreme deep sleep state, a value for a wakeup code (e.g., random or pseudorandom number, or more generally, a locally or temporally unique value) may be generated. For example, the wakeup code value may be generated by a hardware random number generator (RNG) or a hardware pseudorandom number generator (PRNG) on the SoC device or processor, or by executing an instruction that generates a random or pseudorandom number. It may be determined, at 1920, whether the generated wakeup code value is a reserved value. For example, logic on the SoC device or processor may compare the wakeup code value that was generated against a list of reserved wakeup code values to determine whether the generated wakeup code value is a reserved value. If so, the generated wakeup code value may be discarded and step 1915 may be repeated one or more times, and one or more other values for the wakeup code may be generated, until a value that is not a reserved value is generated. If, or once, a value for the wakeup code is generated that is not a reserved value, method 1900 may proceed to 1925.

At 1925, the generated wakeup code value may be written to a location in the real-time-clock (RTC) domain in the system (e.g., to a register or other memory location within an RTC power domain to which power will be provided while the SoC device and/or a processor thereof are the extreme deep sleep state). This location may be a dedicated storage location for storing the wakeup code value or may be a general-purpose storage location that has been designated for storing the wakeup code value, in different embodiments. At 1930, the generated wakeup code value may be written to a location on a flash memory device. For example, the generated wakeup code value may be written to a register or other storage location that is not in the flash memory array of the flash memory device (e.g., a location within a write detect block on the flash memory device). This location may be a dedicated storage location for storing the wakeup code value or may be a general-purpose storage location that has been designated for storing the wakeup code value, in different embodiments. Once the generated wakeup code value has been written to the RTC power domain and to the flash memory device, power management logic may be triggered, at 1935, to cause the processor and/or an SoC device on which the processor resides to enter an extreme deep sleep state. Entering the extreme deep sleep state may include powering down any or all portions of the system other than the RTC power domain.

In some embodiments, a first part of the wake-up mechanism may include executing a portion of the boot ROM on the SoC device, which might not involve volatile memory nor any of the contents of the flash memory array. In such embodiments, instructions executed from the boot ROM may verify the signature of the image it wants to execute next (e.g., an image stored in the flash memory array on the flash memory device that represents a wakeup sequence or another execution sequence whose progress was interrupted by entry into the extreme deep sleep state). The instructions executed from the boot ROM may also (either before or after verifying the signature of the image) read the wakeup code location within the WDB and compare it to the wakeup code location in the RTC power domain of the SoC device to see if they match. Instructions that implement the portion of the wake-up mechanism that determines whether or not the contents of the flash memory device are still valid may be included in ROM on the SoC device. In some embodiments, some or all of the instructions that implement the rest of the wake-up mechanism may be on the flash memory device, since there may not be any other RAM whose contents is retained during extreme deep sleep mode. In such embodiments, once the instructions within the boot ROM have determined that the contents of the flash memory device are still valid, the instructions within the boot ROM may begin reading the contents of the flash memory array, which may be executed by the processor to continue the wake-up sequence. In one embodiment, the flash memory device may include support for an execute-in-place (XIP) mechanism, and the system may include hardware circuitry for reading and comparing the values in the wakeup code location within the WDB and the wakeup code location in the RTC power domain of the SoC device. In this example, the system may resume execution directly out of the flash memory device without the involvement of the boot ROM.

Figure 20:
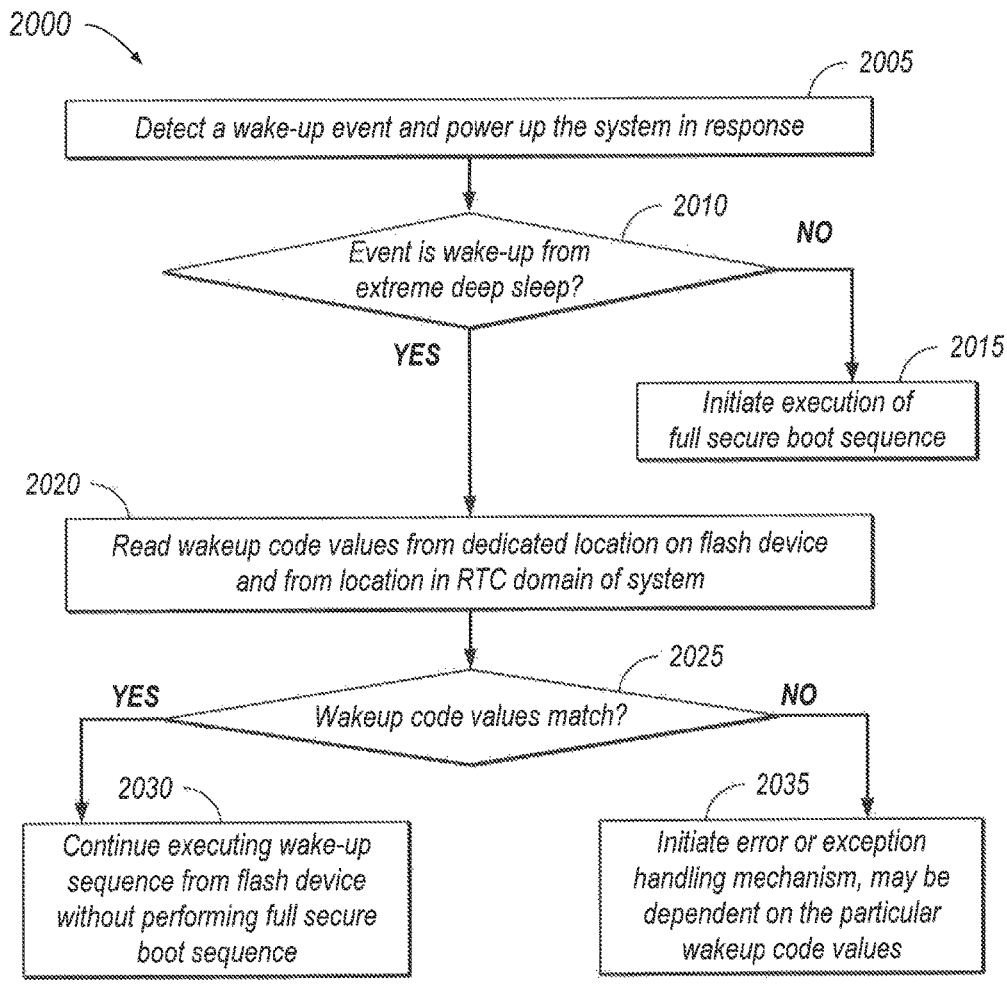
FIG. 20 is an illustration of a method for determining, when waking up from an extreme deep sleep state, whether flash memory tampering has taken place, according to embodiments of the present disclosure, according to embodiments of the present disclosure.

FIG. 20 is an illustration of a method 2000 for determining, when waking up from an extreme deep sleep state, whether flash memory tampering has taken place, according to embodiments of the present disclosure. Method 2000 may be implemented by any of the elements shown in FIGS. 1-18. Method 2000 may be initiated by any suitable criteria and may initiate operation at any suitable point. In one embodiment, method 2000 may initiate operation at 2005. Method 2000 may include greater or fewer steps than those illustrated. Moreover, method 2000 may execute its steps in an order different than those illustrated below. Method 2000 may terminate at any suitable step. Moreover, method 2000 may repeat operation at any suitable step. Method 2000 may perform any of its steps in parallel with other steps of method 2000, or in other methods. Furthermore, method 2000 may be executed multiple times to determine, at different times during the operation of the system, whether flash memory tampering has taken place during an extreme deep sleep state, as appropriate.

At 2005, in one embodiment, a wake-up event may be detected and, in response, the system may be powered up. For example, any or all portions of the system that were previously powered down may be powered up (e.g., by power management logic on the SoC device). At 2010, it may be determined whether the wake-up event is a wake-up from an extreme deep sleep state. If not, (e.g., if it is a power-on event), at 2015, the execution of a full secure boot sequence may be initiated. Otherwise, if it is determined that the wake-up event is a wake-up from an extreme deep sleep state, method 2000 may continue at 2020.

At 2020, the wakeup code values currently stored in the dedicated location on the flash memory device and in the dedicated location in the RTC power domain of the system may be read. At 2025, it may be determined whether these wakeup code values match. If so, at 2030 execution of the wake-up sequence from the flash memory device may continue without performing a full secure boot sequence. Otherwise, if the wakeup code values do not match, at 2035 an error or exception handling mechanism may be initiated. In some embodiments (e.g., in embodiments in which different reserved wakeup code values represent different potential tampering activities or classes of potential tampering activities), the particular error or exception handling mechanism that is initiated may be dependent on the particular wakeup code values that are read from the flash memory device. The error or exception handling mechanism may be implemented in hardware and/or by the execution of one or more instructions. For example, the error or exception handling mechanism may attempt to determine whether tampering has actually taken place and, if so, may initiate corrective action (which may include executing a full secure boot sequence, restarting the system, or shutting down the system, in some cases).

Method 2000 may be performed subsequent to performance of method 1900, wherein a specific wakeup code value generated when entering an extreme deep sleep state is compared to the wakeup code value that is read from the flash memory device upon waking up from the extreme deep sleep state.

In at least some embodiments, one or more of the following attack scenarios may be detected and/or mitigated by the security mechanism described herein: modifications of content in the flash memory array of the flash memory device (as the WDB content, including the wakeup code value, will be cleared or replaced); trying out different wakeup code values during one extreme deep sleep phase (as the WDB content, including the wakeup code value, will be cleared after the first read operation that targets the WDB); or trying out different wakeup code values during several extreme deep sleep phases (as for every individual extreme deep sleep phase, a new wakeup code value will be generated and used).

In some embodiments, when any of these activities is detected, the WDB may replace the wakeup code value with a reserved NULL value (e.g., a value including all zeros or another value that represents a NULL condition or an invalid wakeup code). In other embodiments, when one of these activities is detected, the WDB may replace the wakeup code value with a respective one of multiple reserved values, each of which may represent a different malicious (or suspicious) activity or class of activities. In such embodiments, if the wakeup code value that is read from the WDB upon waking up does not match the wakeup code value stored on the SoC device, the wake-up mechanism on the SoC device may compare the wakeup code value that was read from the WDB against a list of reserved wakeup code values to determine the activity (or type of activity) that was detected by the WDB. In another embodiment, prior to entering the extreme deep sleep state, the SoC device may generate multiple different wakeup code values, each corresponding to a different potentially malicious condition, event, or activity, and may store them in respective locations in both the RTC power domain and in the WDB of the flash memory device. In this example, when one of these potentially malicious conditions, events, or activities is detected, the WDB may replace the corresponding wakeup code value with a reserved NULL value. In this example, if one of the wakeup code values that is read from the WDB upon waking up does not match the corresponding wakeup code value stored on the SoC device, the wake-up mechanism on the SoC device may determine which of the potentially malicious conditions, events, or activities was detected based on which pair of wakeup code values do not match.

Figure 21:
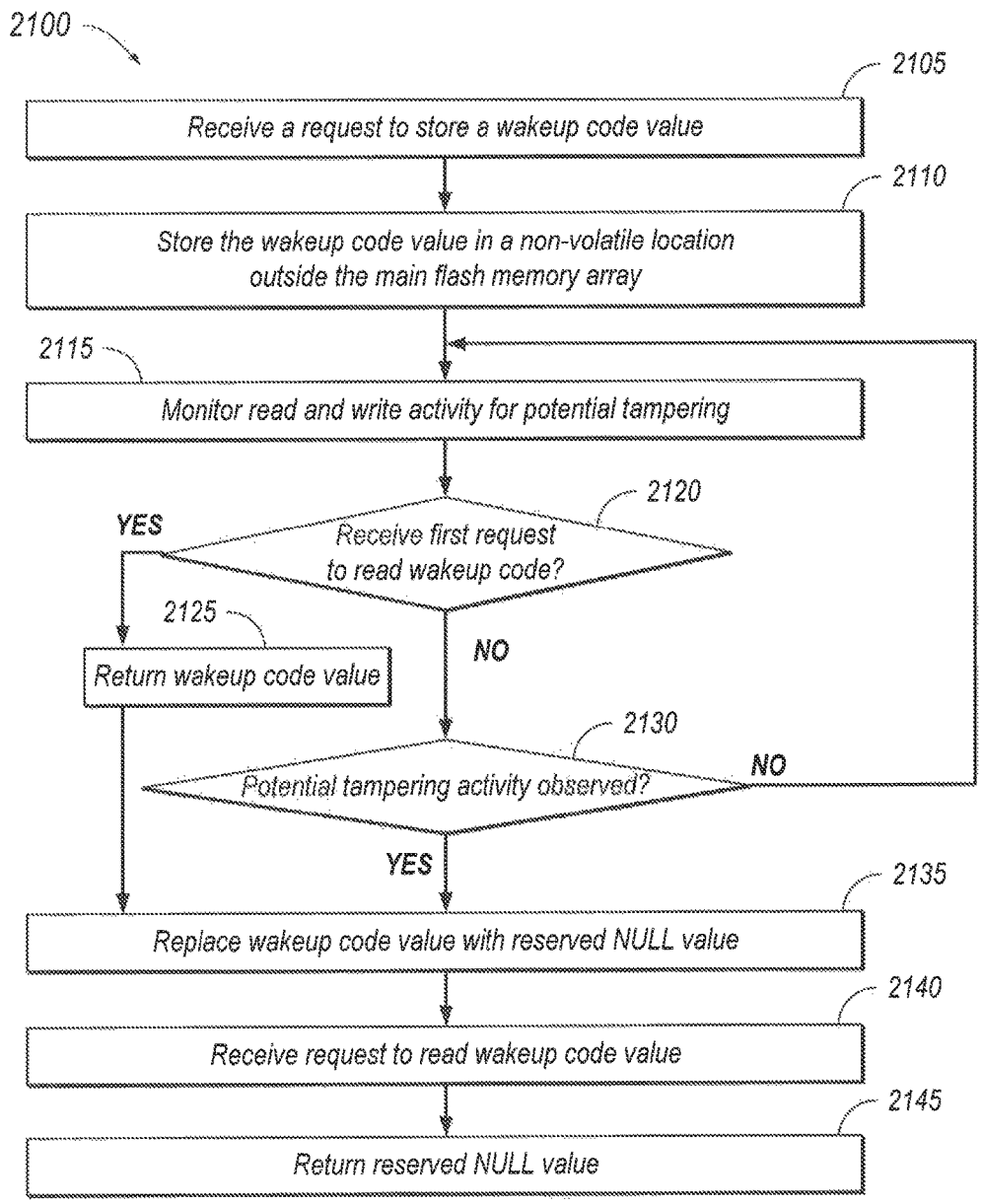
FIG. 21 is an illustration of a method for indicating whether or not flash memory tampering has potentially taken place during an extreme deep sleep state, according to embodiments of the present disclosure.

FIG. 21 is an illustration of a method 2100 for indicating (e.g., to an SoC device in the system or to a processor thereof) whether or not flash memory tampering has potentially taken place during an extreme deep sleep state, according to embodiments of the present disclosure. Method 2100 may be implemented by any of the elements shown in FIGS. 1-18. Method 2100 may be initiated by any suitable criteria and may initiate operation at any suitable point. In one embodiment, method 2100 may initiate operation at 2105. Method 2100 may include greater or fewer steps than those illustrated. Moreover, method 2100 may execute its steps in an order different than those illustrated below. Method 2100 may terminate at any suitable step. Moreover, method 2100 may repeat operation at any suitable step. Method 2100 may perform any of its steps in parallel with other steps of method 2100, or in other methods.

At 2105, a request to store a wakeup code value may be received. For example, the request may be received by a flash memory device from an SoC device. At 2110, the wakeup code value may be stored in a non-volatile location outside the main flash memory array. For example, it may be stored in a dedicated register or another designated location within a write detect block. At 2115, read and write activity may begin to be monitored for potential tampering activity. If, at 2120, a first request to read the value of the wakeup code is received, then at 2125, the wakeup code value may be returned to the requestor, after which method 2100 may continue at step 2135. Otherwise, at 2130, monitoring for potential tampering may continue until and unless any potential tampering activity is observed. If and when potential tampering activity is observed (or after receiving a first read request for the wakeup code value at 2120), at step 2135, the wakeup code value that was written to a dedicated location in the flash memory device at step 2110 may be replaced in that location with a reserved NULL value. At 2140, if a request to read the wakeup code value is subsequently received, then at 2145, the reserved NULL value may be returned to the requestor.

Portions of method 2100 may be performed in conjunction with method 1900, wherein writing the wakeup code value to the flash memory device at 1930 corresponds to receiving the wakeup code value by the flash memory device at 2105. In addition, the wakeup code value read from the flash memory device at step 2020 of method 2000 may be the reserved NULL value written to the dedicated location in the flash memory device at step 2135.

Figure 22:
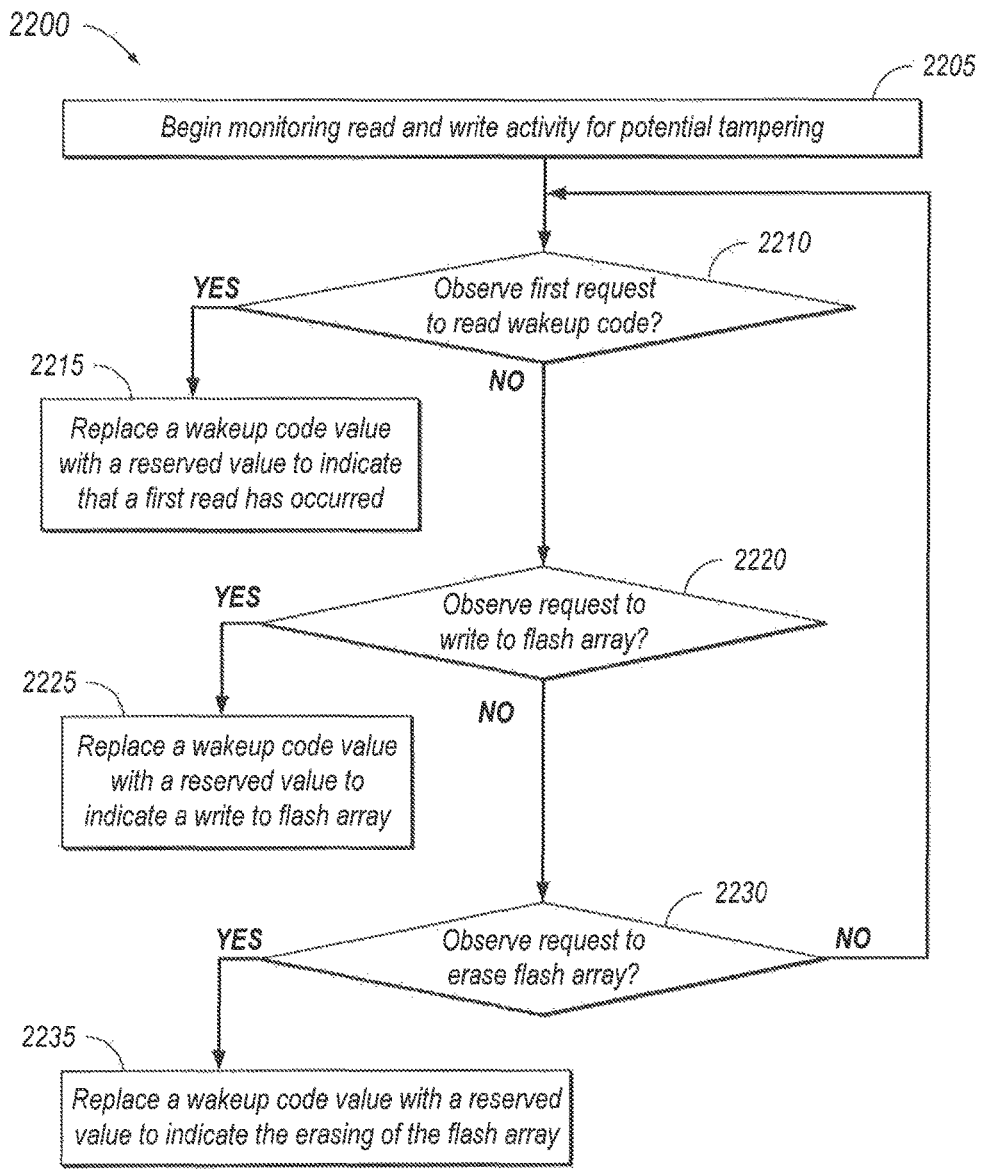
FIG. 22 is an illustration of a method for indicating that potential tampering activity has been observed in a flash memory device, according to embodiments of the present disclosure.

FIG. 22 is an illustration of a method 2200 for indicating (e.g., to an SoC device in the system or to a processor thereof) that potential tampering activity has been observed in a flash memory device, according to embodiments of the present disclosure. Method 2200 may be implemented by any of the elements shown in FIGS. 1-18. Method 2200 may be initiated by any suitable criteria and may initiate operation at any suitable point. In one embodiment, method 2200 may initiate operation at 2205. Method 2200 may include greater or fewer steps than those illustrated. Moreover, method 2200 may execute its steps in an order different than those illustrated below. Method 2200 may terminate at any suitable step. Moreover, method 2200 may repeat operation at any suitable step. Method 2200 may perform any of its steps in parallel with other steps of method 2200, or in other methods.

At 2205, monitoring of read and write activity for potential tampering may begin. If, at 2210, a first request to read the wakeup code value is observed, then at 2215, a wakeup code value that was previously written to a dedicated location in the flash memory device may be replaced in that location with a reserved value to indicate that the first read of the wakeup code value has occurred. For example, in an embodiment in which there is a single wakeup code location in the flash memory device, the value in that wakeup code location may be replaced with a reserved value that explicitly indicates that the first read of the wakeup code value has occurred. In an embodiment in which there are multiple wakeup code locations in the flash memory device, the value in a wakeup code location corresponding to this type of potentially malicious activity may be replaced with a NULL value to indicate that the first read of the wakeup code value has occurred. Otherwise, monitoring read and write activity for potential tampering activity may continue.

If at step 2220, a request to write to the flash memory array (e.g., to modify one or more locations in the flash memory array) is observed, then at 2225, a wakeup code value that was previously written to a dedicated location in the flash memory device may be replaced with a reserved value to indicate that a write to the flash memory array has been observed. For example, in an embodiment in which there is a single wakeup code location in the flash memory device, the value in that wakeup code location may be replaced with a reserved value that explicitly indicates that a write to the flash memory array has been observed. In an embodiment in which there are multiple wakeup code locations in the flash memory device, the value in a wakeup code location corresponding to this type of potentially malicious activity may be replaced with a NULL value to indicate that a write to the flash memory array has been observed. In another example, if at step 2230, a request to erase all or a portion of the flash memory array is observed, then at 2235, a wakeup code value that was previously written to a dedicated location in the flash memory device may be replaced with a reserved value to indicate the erasing of the flash memory array. For example, in an embodiment in which there is a single wakeup code location in the flash memory device, the value in that wakeup code location may be replaced with a reserved value that explicitly indicates that the flash memory array has been erased. In an embodiment in which there are multiple wakeup code locations in the flash memory device, the value in a wakeup code location corresponding to this type of potentially malicious activity may be replaced with a NULL value to indicate that the flash memory array has been erased.

In some embodiments, method 2200 may be performed as part of the performance of a method for indicating whether or not flash memory tampering has potentially taken place during an extreme deep sleep state (such as method 2100 described above), wherein multiple different types of potential tampering activities may be detected and identified by the flash memory device for subsequent handling by the processor or SoC device. In such embodiments, step 2130 may include one of steps 2220 or 2230, step 2135 may be replaced by one of steps 2215, 2225 or 2235, and the value returned in step 2145 may be a reserved value other than a reserved NULL value. In addition, step 2205 may be similar to step 2115 and step 2210 may be similar to step 2120. Note that while the example embodiment illustrated in FIG. 22 includes logic for detecting three different conditions that, when observed, trigger the replacement of the wakeup code value stored on the flash memory device with a reserved value (e.g., a NULL value or a value indicating the condition that was detected), in other embodiments, a write detect block may include logic for detecting more, fewer, or different conditions that when observed, trigger the replacement of the wakeup code value stored on the flash memory device with a reserved value (e.g., a single reserved value or one of multiple reserved values).

In some embodiments, the wake-up mechanism associated with the extreme deep sleep state may be selected for use as a wake-up sequence for a deep sleep mode in some cases (e.g., for reasonable periods of inactivity and/or sleep durations), while the wake-up mechanism associated with power-down/power-up sequences may selected for use as a wake-up sequence in other cases (e.g., for longer periods of inactivity and/or sleep durations). In one example, a particular device (e.g., a standalone modem) may be attached to a container that is being shipped around the world, and the device may wake up just once or twice a day to push out its location or to perform another type of task. Since this device experiences very long periods of inactivity, separated by some kind of RTC alarm, it may be safer to rerun the secure boot sequence each time the device wakes up from a deep sleep state or an extreme deep sleep state. In general, whenever a system enters a sleep mode (e.g., a deep sleep state or an extreme deep sleep state), there may be an option to specify conditions under which the secure boot sequence should be performed upon waking up, regardless of the sleep mode type. In one example, a configurable threshold may be set to specify that if the system remains in a sleep mode longer than one hour, the secure boot sequence should be performed upon waking up, regardless of the sleep mode type.

The security mechanisms described herein may provide support for an extreme deep sleep state that results in more power savings than a deep sleep state in which context is retained in RAM. These security mechanisms may support a corresponding fast, secure wake-up from the extreme deep sleep state. The use of these security mechanisms may significantly reduce standby power consumption for battery-powered devices, thereby extending battery lifetimes. While example embodiments are described in terms of a system that includes an SoC baseband device and a flash memory device, these security mechanisms may be applied in a wide variety of power-sensitive applications, including mobile devices, wearable devices, or, in general, any type of embedded system that would benefit from reduced power consumption under certain conditions (such as periods of inactivity).

While embodiments of the present disclosure are described in terms of security mechanisms for determining whether or not a flash memory device has been tampered with during an extreme deep sleep state, in other embodiments these security mechanisms may be used to determine whether or not an external SDRAM device has been tampered with during a deep sleep state. For example, one or more wakeup code values may be written to designated locations within an external SDRAM device and to dedicated locations within any portion of the SoC device that remains powered up during the deep sleep state. In this example, the external SDRAM device may include circuitry or other logic to detect potentially malicious conditions, events, or activities involving the external SDRAM device while the SoC device is in the deep sleep state and to update the value of one or more wakeup code locations accordingly. Upon waking up from the deep sleep state, the values in the wakeup code locations in the SDRAM device and the SoC device may be compared with each other to determine whether or not a potentially malicious condition, event, or activity was detected while the SoC device was in the deep sleep state.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a first logic to store, prior to a deep sleep state in which the processor is powered down, a wakeup code value to a first wakeup code location in a power domain, a second logic to store, prior to the deep sleep state, the wakeup code value to a second wakeup code location in a non-volatile memory device, a third logic to compare, subsequent to a wake-up from the deep sleep state and prior to completion of a boot operation, a value read from the first wakeup code location and a value read from the second wakeup code location, a fourth logic to determine whether the value read from the first wakeup code location and the value read from the second wakeup code location match, and a fifth logic to trigger, in response to a determination that the value read from the first wakeup code location and the value read from the second wakeup code location do not match, action by an exception handling circuit. In any of the above embodiments, power may be maintained for the power domain in the deep sleep state. In combination with any of the above embodiments, the processor may include a sixth logic to generate the wakeup code value for the deep sleep state. In any of the above embodiments, the sixth logic may generate a random number or a pseudorandom number as the wakeup code value. In any of the above embodiments, the sixth logic may generate a locally or temporally unique wakeup code value for the deep sleep state. In combination with any of the above embodiments, the processor may include a sixth logic to generate the wakeup code value for the deep sleep state, a seventh logic to determine whether the generated wakeup code value for the deep sleep state matches a reserved or restricted value, and an eighth logic to discard the generated wakeup code value for the deep sleep state in response to a determination that it matches a reserved or restricted value. In combination with any of the above embodiments, the exception handling circuit may include a sixth logic to execute a secure boot sequence by the processor. In combination with any of the above embodiments, the exception handling circuit may include a sixth logic to restart the processor or to power down the processor. In combination with any of the above embodiments, the processor may include a sixth logic to store, to the non-volatile memory device prior to the deep sleep state, context for the resumption of operation by the processor upon a wake-up from the deep sleep state. In combination with any of the above embodiments, the processor may include a sixth logic to store, to the non-volatile memory device prior to the deep sleep state, context for the resumption of operation by the processor upon a wake-up from the deep sleep state, and a seventh logic to execute a wake-up sequence by the processor, in response to a determination that the value read from the first wakeup code location and the value read from the second wakeup code location match. In any of the above embodiments, execution of the wake-up sequence may include one or more accesses to the context stored to the non-volatile memory device. In combination with any of the above embodiments, the processor may include a sixth logic to determine that the processor will enter the deep sleep state, and a seventh logic to initiate entry into the deep sleep state. In combination with any of the above embodiments, the processor may include a sixth logic to implement multiple low power states, including the deep sleep state, and a seventh logic to maintain power for fewer power domains in the deep sleep state than the number of power domains for which it maintains power in at least one other one of the low power states. In combination with any of the above embodiments, the processor may include a sixth logic to determine, dependent on the value read from the second wakeup code location, whether potentially malicious activity was directed to the non-volatile memory device while the processor was in the deep sleep state. In combination with any of the above embodiments, the processor may include a sixth logic to initiate entry into the deep sleep state, including a seventh logic to shut down power to the other power domains, an eighth logic to cause the processor to wake up from the deep sleep state, including a ninth logic to restore power to the other power domains, a tenth logic to initiate, subsequent to the wake-up from the deep sleep state and prior to completion of a boot operation, execution of a wake-up sequence, including an eleventh logic to compare a value read from the second wakeup code location to a value read from the first wakeup code location, and a twelfth logic to determine whether the value read from the second wakeup code location and the value read from the first wakeup code location match. In combination with any of the above embodiments, the processor may include a sixth logic to initiate, in response to a determination that the value read from the first wakeup code location and the value read from the second wakeup code location do not match, an exception handling sequence, including a seventh logic to execute a secure boot sequence, an eighth logic to initiate a restart, or a ninth logic to power down one or more power domains. In combination with any of the above embodiments, the processor may include multiple power domains, and a power management circuit to regulate power for the power domains. In any of the above embodiments, a first one of the power domains may be to remain powered on in a deep sleep state in which the processor is powered down. In combination with any of the above embodiments, the power management circuit may include a sixth logic to determine that the system will enter the deep sleep state, and a seventh logic to power down one or more of the plurality of power domains other than the power domain in which power is maintained in the deep sleep state. The determination may be dependent on detection of inactivity in the system or execution of an instruction to initiate entry into the deep sleep state by the processor. In combination with any of the above embodiments, the power management circuit may include a sixth logic to determine that the system will enter the deep sleep state, and a seventh logic to notify the processor that the system will enter the deep sleep state. In combination with any of the above embodiments, the power management circuit may include a sixth logic to detect a wake-up event, and a seventh logic to power up one or more power domains in response to detection of the wake-up event, where the one or more power domains were powered down upon entry into the deep sleep state, and where the one or more power domains do not include the power domain in which power is maintained in the deep sleep state. In any of the above embodiments, the processor may be implemented on a system-on-chip (SOC) device.

Some embodiments of the present disclosure include a method. In at least some of these embodiments, the method may include storing, prior to a deep sleep state, a wakeup code value to a first wakeup code location in a first power domain where power is maintained for the first power domain in the deep sleep state, storing, prior to the deep sleep state, the wakeup code value to a second wakeup code location in a non-volatile memory device, entering the deep sleep state, waking up from the deep sleep state, and beginning, subsequent to waking up from the deep sleep state and prior to completing a boot operation, execution of a wake-up sequence. In any of the above embodiments, entering the deep sleep state may include shutting down power to one or more other power domains. In any of the above embodiments, waking up from the deep sleep state may include restoring power to the one or more other power domains. In any of the above embodiments, beginning execution of the wake-up sequence may include comparing a value read from the second wakeup code location to a value read from the first wakeup code location, and determining whether the value read from the second wakeup code location and the value read from the first wakeup code location match. In combination with any of the above embodiments, the method may include triggering, in response to determining that the value read from the first wakeup code location and the value read from the second wakeup code location do not match, action by an exception handling circuit. In any of the above embodiments, triggering action by an exception handling circuit may include triggering execution of a secure boot sequence by a processor. In any of the above embodiments, triggering action by an exception handling circuit may include triggering a restart of a processor or the powering down a processor. In combination with any of the above embodiments, the method may include generating the wakeup code value. In any of the above embodiments, generating the wakeup code value may include generating a random number or a pseudorandom number as the wakeup code value for the deep sleep state. In any of the above embodiments, generating the wakeup code value may include generating a locally or temporally unique wakeup code value for the deep sleep state. In combination with any of the above embodiments, the method may include generating the wakeup code value, determining whether the generated wakeup code value matches a reserved or restricted value, and, in response to determining that the generated wakeup code value matches a reserved or restricted value, discarding the generated wakeup code value, and generating a second wakeup code value. In combination with any of the above embodiments, the method may include storing to the non-volatile memory device prior to the deep sleep state, context for resuming operation by a processor upon waking up from the deep sleep state, and continuing to execute the wake-up sequence, in response to determining that the value read from the first wakeup code location and the value read from the second wakeup code location match. In any of the above embodiments, continuing to execute the wake-up sequence may include accessing the context stored to the non-volatile memory device. In combination with any of the above embodiments, the method may include determining that a processor will enter the deep sleep state, and initiating entry into the deep sleep state. In combination with any of the above embodiments, the method may include determining that a processor will enter the deep sleep state, and powering down one or more power domains other than the first power domain. In combination with any of the above embodiments, the method may include determining that a processor will enter the deep sleep state, and notifying the processor that the system will enter the deep sleep state. In any of the above embodiments, determining that a processor will enter the deep sleep state may be dependent on the detection of inactivity or the execution of an instruction to initiate entry into the deep sleep state by the processor. In combination with any of the above embodiments, the method may include implementing multiple low power states, including the deep sleep state and maintaining power for fewer power domains in the deep sleep state than the number of power domains for which power is maintained in at least one other low power state. In combination with any of the above embodiments, the method may include executing, in response to determining that the value read from the first wakeup code location and the value read from the second wakeup code location do not match, an exception handling sequence, including executing a secure boot sequence, initiating a restart, or powering down one or more power domains. In combination with any of the above embodiments, the method may include determining, dependent on the value read from the second wakeup code location, whether potentially malicious activity was directed to the non-volatile memory device while in the deep sleep state. In combination with any of the above embodiments, the method may include detecting a wake-up event, and powering up one or more power domains in response to detecting the wake-up event. The power domains to be powered up in response to detecting the wake-up event may include one or more power domains that were powered down upon entry into the deep sleep state, but not the first power domain.

Some embodiments of the present disclosure include a system. In at least some of these embodiments, the system may include a processor to execute instructions, multiple power domains, and a power management circuit to regulate power for the power domains. A first one of the power domains may remain powered on in a deep sleep state in which the processor is powered down. The processor may include a first logic to store, prior to the deep sleep state, a wakeup code value to a first wakeup code location in the first power domain, a second logic to store, prior to the deep sleep state, the wakeup code value to a second wakeup code location in a non-volatile memory device, a third logic to compare, subsequent to a wake-up from the deep sleep state and prior to completion of a boot operation, a value read from the first wakeup code location and a value read from the second wakeup code location, a fourth logic to determine whether the value read from the first wakeup code location and the value read from the second wakeup code location match, and a fifth logic to trigger, in response to a determination that the value read from the first wakeup code location and the value read from the second wakeup code location do not match, action by an exception handling circuit. In combination with any of the above embodiments, the processor may include a sixth logic to store, to the non-volatile memory device prior to the deep sleep state, context for the resumption of operation by the processor upon a wake-up from the deep sleep state, and a seventh logic to execute, in response to a determination that the value read from the first wakeup code location and the value read from the second wakeup code location match, a wake-up sequence by the processor. The wake-up sequence may include one or more accesses to the context stored to the non-volatile memory device. In combination with any of the above embodiments, the exception handling circuit may include one or more of a sixth logic to execute a secure boot sequence by the processor, a seventh logic to initiate a restart of the system, or an eighth logic to power down one or more of the power domains. In combination with any of the above embodiments, the power management circuit may include a sixth logic to determine that the system will enter the deep sleep state, and a seventh logic to power down one or more of the plurality of power domains other than the first power domain. In combination with any of the above embodiments, the power management circuit may include a sixth logic to determine that the system will enter the deep sleep state, and a seventh logic to notify the processor that the system will enter the deep sleep state. In any of the above embodiments, the determination that the system will enter the deep sleep state may be dependent on the detection of inactivity in the system or the execution of an instruction to initiate entry into the deep sleep state by the processor. In combination with any of the above embodiments, the processor may include a sixth logic to detect a wake-up event, and a seventh logic to power up one or more of the plurality of power domains in response to detection of the wake-up event, where the one or more power domains were powered down upon entry into the deep sleep state, and where the one or more power domains do not include the first power domain. In combination with any of the above embodiments, the processor may include a sixth logic to generate the wakeup code value for the deep sleep state. In any of the above embodiments, the sixth logic may generate a random number or a pseudorandom number as the wakeup code value. In any of the above embodiments, the sixth logic may generate a locally or temporally unique wakeup code value for the deep sleep state. In combination with any of the above embodiments, the processor may include a sixth logic to generate the wakeup code value for the deep sleep state, a seventh logic to determine whether the generated wakeup code value for the deep sleep state matches a reserved or restricted value, and an eighth logic to discard the generated wakeup code value for the deep sleep state in response to a determination that it matches a reserved or restricted value. In combination with any of the above embodiments, the processor may include a sixth logic to implement multiple low power states, including the deep sleep state, and a seventh logic to maintain power for fewer power domains in the deep sleep state than the number of power domains for which it maintains power in at least one other one of the low power states. In combination with any of the above embodiments, the processor may include a sixth logic to determine, dependent on the value read from the second wakeup code location, whether potentially malicious activity was directed to the non-volatile memory device while the processor was in the deep sleep state. In combination with any of the above embodiments, the processor may include a sixth logic to initiate entry into the deep sleep state, including a seventh logic to shut down power to the other power domains, an eighth logic to cause the processor to wake up from the deep sleep state, including a ninth logic to restore power to the other power domains, a tenth logic to initiate, subsequent to the wake-up from the deep sleep state and prior to completion of a boot operation, execution of a wake-up sequence, including an eleventh logic to compare a value read from the second wakeup code location to a value read from the first wakeup code location, and a twelfth logic to determine whether the value read from the second wakeup code location and the value read from the first wakeup code location match. In combination with any of the above embodiments, the processor may include a sixth logic to initiate, in response to a determination that the value read from the first wakeup code location and the value read from the second wakeup code location do not match, an exception handling sequence, including a seventh logic to execute a secure boot sequence, an eighth logic to initiate a restart, or a ninth logic to power down one or more power domains. In any of the above embodiments, the system may include a system-on-chip (SOC) device. The processor may be implemented on the SOC device. In combination with any of the above embodiments, the system may include a non-volatile memory device. The non-volatile memory device may include a non-volatile memory array, and a write detect block. The write detect block may include a non-volatile wakeup code location to store a wakeup code value, a first logic to receive the wakeup code value, a second logic to store the wakeup code value to the wakeup code location, a third logic to detect, subsequent to storage of the wakeup code value to the wakeup code location, a condition or event to trigger replacement of the wakeup code value in the non-volatile storage location, and a fourth logic to replace the wakeup code value in the wakeup code location with an alternate value. In any of the above embodiments, the non-volatile memory device may be a flash memory device. In any of the above embodiments, the non-volatile memory array may be a flash memory array.

Some embodiments of the present disclosure include a system for executing instructions. In at least some of these embodiments, the system may include means for include storing, prior to a deep sleep state, a wakeup code value to a first wakeup code location in a first power domain where power is maintained for the first power domain in the deep sleep state, means for storing, prior to the deep sleep state, the wakeup code value to a second wakeup code location in a non-volatile memory device, means for entering the deep sleep state, means for waking up from the deep sleep state, and means for beginning, subsequent to waking up from the deep sleep state and prior to completing a boot operation, execution of a wake-up sequence. In any of the above embodiments, the means for entering the deep sleep state may include means for shutting down power to one or more other power domains. In any of the above embodiments, the means for waking up from the deep sleep state may include means for restoring power to the one or more other power domains. In any of the above embodiments, the means for beginning execution of the wake-up sequence may include means for comparing a value read from the second wakeup code location to a value read from the first wakeup code location, and means for determining whether the value read from the second wakeup code location and the value read from the first wakeup code location match. In combination with any of the above embodiments, the system may include means for triggering, in response to determining that the value read from the first wakeup code location and the value read from the second wakeup code location do not match, action by an exception handling circuit. In any of the above embodiments, the means for triggering action by an exception handling circuit may include means for triggering execution of a secure boot sequence by a processor. In any of the above embodiments, the means for triggering action by an exception handling circuit may include means for triggering a restart of a processor or the powering down a processor. In combination with any of the above embodiments, the system may include means for generating the wakeup code value. In any of the above embodiments, the means for generating the wakeup code value may include means for generating a random number or a pseudorandom number as the wakeup code value for the deep sleep state. In any of the above embodiments, the means for generating the wakeup code value may include means for generating a locally or temporally unique wakeup code value for the deep sleep state. In combination with any of the above embodiments, the system may include means for generating the wakeup code value, means for determining whether the generated wakeup code value matches a reserved or restricted value, and means for discarding the generated wakeup code value and generating a second wakeup code value, in response to determining that the generated wakeup code value matches a reserved or restricted value. In combination with any of the above embodiments, the system may include means for storing to the non-volatile memory device prior to the deep sleep state, context for resuming operation by a processor upon waking up from the deep sleep state, and means for continuing to execute the wake-up sequence, in response to determining that the value read from the first wakeup code location and the value read from the second wakeup code location match. In any of the above embodiments, the means for continuing to execute the wake-up sequence may include means for accessing the context stored to the non-volatile memory device. In combination with any of the above embodiments, the system may include means for determining that a processor will enter the deep sleep state, and means for initiating entry into the deep sleep state. In combination with any of the above embodiments, the system may include means for determining that a processor will enter the deep sleep state, and means for powering down one or more power domains other than the first power domain. In combination with any of the above embodiments, the system may include means for determining that a processor will enter the deep sleep state, and means for notifying the processor that the system will enter the deep sleep state. In any of the above embodiments, the means for determining that a processor will enter the deep sleep state may be dependent on the detection of inactivity or the execution of an instruction to initiate entry into the deep sleep state by the processor. In combination with any of the above embodiments, the system may include means for implementing multiple low power states, including the deep sleep state, and means for maintaining power for fewer power domains in the deep sleep state than the number of power domains for which power is maintained in at least one other low power state. In combination with any of the above embodiments, the system may include means for executing, in response to determining that the value read from the first wakeup code location and the value read from the second wakeup code location do not match, an exception handling sequence, including means for executing a secure boot sequence, initiating a restart, or powering down one or more power domains. In combination with any of the above embodiments, the system may include means for determining, dependent on the value read from the second wakeup code location, whether potentially malicious activity was directed to the non-volatile memory device while in the deep sleep state. In combination with any of the above embodiments, the system may include means for detecting a wake-up event, and means for powering up one or more power domains in response to detecting the wake-up event. The power domains to be powered up in response to detecting the wake-up event may include one or more power domains that were powered down upon entry into the deep sleep state, but not the first power domain.

Some embodiments of the present disclosure include a non-volatile memory device. In at least some of these embodiments, the non-volatile memory device may include a non-volatile memory array, and a write detect block. The write detect block may include a non-volatile wakeup code location to store a wakeup code value, a first logic to receive the wakeup code value, a second logic to store the wakeup code value to the wakeup code location, a third logic to detect, subsequent to storage of the wakeup code value to the wakeup code location, a condition or event to trigger replacement of the wakeup code value in the wakeup code location, and a fourth logic to replace the wakeup code value in the wakeup code location with an alternate value. In any of the above embodiments, the wakeup code location may be outside of the non-volatile memory array. In any of the above embodiments, the condition or event may be indicative of potential tampering activity. In any of the above embodiments, the alternate value may be a reserved or restricted value to represent a NULL value. In any of the above embodiments, the alternate value may be one of multiple reserved or restricted values with which the wakeup value can be replaced. In combination with any of the above embodiments, the third logic may be to detect a write to the non-volatile memory array. In combination with any of the above embodiments, the third logic may be to detect a write to the wakeup code location. In combination with any of the above embodiments, the third logic may be to detect the erasure of at least a portion of the non-volatile memory array. In any of the above embodiments, the alternate value may be a reserved or restricted value to indicate that a write to the non-volatile memory array was detected. In any of the above embodiments, the alternate value may be a reserved or restricted value to indicate that a write to the wakeup code location was detected. In any of the above embodiments, the alternate value may be a reserved or restricted value to indicate that an erasure of at least a portion of the non-volatile memory array was detected. In combination with any of the above embodiments, the non-volatile memory device may include a fifth logic to receive, subsequent to storage of the wakeup code value to the wakeup code location, a first read request directed to the wakeup code location, and a sixth logic to return the wakeup code value. In combination with any of the above embodiments, the non-volatile memory device may include a fifth logic to receive, subsequent to storage of the wakeup code value to the wakeup code location, a first read request directed to the wakeup code location, a sixth logic to return the wakeup code value, a seventh logic to receive a second read request directed to the wakeup code location, and an eighth logic to return the alternate value. In combination with any of the above embodiments, the non-volatile memory device may include a fifth logic to receive input to represent a secure boot sequence, a wake-up sequence, or an exception-handling sequence, and a sixth logic to store the input to the non-volatile memory array. In combination with any of the above embodiments, the non-volatile memory device may include a fifth logic to receive, from a processor, input to represent context for the resumption of operation by the processor upon a wake-up from the deep sleep state, and a sixth logic to store the input to the non-volatile memory array. In any of the above embodiments, the non-volatile memory device may be a flash memory device. In any of the above embodiments, the non-volatile memory array may be a flash memory array.

Some embodiments of the present disclosure include a method. In at least some of these embodiments, the method may include, in a non-volatile memory device, receiving a wakeup code value, storing the wakeup code value to a non-volatile wakeup code location, detecting, subsequent to storing the wakeup code value to the wakeup code location, a condition or event that triggers replacement of the wakeup code value in the wakeup code location, and replacing the wakeup code value in the wakeup code location with an alternate value. In any of the above embodiments, the non-volatile memory device may include a non-volatile memory array, and the wakeup code location may be outside of the non-volatile memory array. In any of the above embodiments, the condition or event may be indicative of potential tampering activity. In any of the above embodiments, the alternate value may be a reserved or restricted value to represent a NULL value. In any of the above embodiments, the alternate value may be one of multiple reserved or restricted values with which the wakeup value can be replaced. In combination with any of the above embodiments, the non-volatile memory device may include a non-volatile memory array, and detecting the condition or event may include detecting a write to the non-volatile memory array. In combination with any of the above embodiments, detecting the condition or event may include detecting a write to the wakeup code location. In combination with any of the above embodiments, the non-volatile memory device may include a non-volatile memory array, and detecting the condition or event may include detecting the erasure of at least a portion of the non-volatile memory array. In any of the above embodiments, the non-volatile memory device may include a non-volatile memory array, and the alternate value may be a reserved or restricted value to indicate that a write to the non-volatile memory array was detected. In any of the above embodiments, the alternate value may be a reserved or restricted value to indicate that a write to the wakeup code location was detected. In any of the above embodiments, the non-volatile memory device may include a non-volatile memory array, and the alternate value may be a reserved or restricted value to indicate that an erasure of at least a portion of the non-volatile memory array was detected. In combination with any of the above embodiments, the method may include receiving, subsequent to storing the wakeup code value to the wakeup code location, a first read request directed to the wakeup code location, and returning the wakeup code value. In combination with any of the above embodiments, the method may include receiving, subsequent to storing the wakeup code value to the wakeup code location, a first read request directed to the wakeup code location, returning the wakeup code value, receiving a second read request directed to the wakeup code location, and returning the alternate value. In combination with any of the above embodiments, the non-volatile memory device may include a non-volatile memory array, and the method may include receiving input representing a secure boot sequence, a wake-up sequence, or an exception-handling sequence, and storing the input to the non-volatile memory array. In combination with any of the above embodiments, the non-volatile memory device may include a non-volatile memory array, and the method may include receiving, from a processor, input representing context for the resumption of operation by the processor upon a wake-up from the deep sleep state, and storing the input to the non-volatile memory array. In any of the above embodiments, the non-volatile memory device may be a flash memory device. In any of the above embodiments, the non-volatile memory array may be a flash memory array.

Some embodiments of the present disclosure include a system. In at least some of these embodiments, the system may include a non-volatile memory array, and a write detect block. The write detect block may include a non-volatile wakeup code location to store a wakeup code value, a first logic to receive the wakeup code value, a second logic to store the wakeup code value to the wakeup code location, a third logic to detect, subsequent to storage of the wakeup code value to the wakeup code location, a condition or event to trigger replacement of the wakeup code value in the wakeup code location, and a fourth logic to replace the wakeup code value in the wakeup code location with an alternate value. In any of the above embodiments, the wakeup code location may be outside of the non-volatile memory array. In any of the above embodiments, the condition or event may be indicative of potential tampering activity. In any of the above embodiments, the alternate value may be a reserved or restricted value to represent a NULL value. In any of the above embodiments, the alternate value may be one of multiple reserved or restricted values with which the wakeup value can be replaced. In combination with any of the above embodiments, the third logic may be to detect a write to the non-volatile memory array. In combination with any of the above embodiments, the third logic may be to detect a write to the wakeup code location. In combination with any of the above embodiments, the third logic may be to detect the erasure of at least a portion of the non-volatile memory array. In any of the above embodiments, the alternate value may be a reserved or restricted value to indicate that a write to the non-volatile memory array was detected. In any of the above embodiments, the alternate value may be a reserved or restricted value to indicate that a write to the wakeup code location was detected. In any of the above embodiments, the alternate value may be a reserved or restricted value to indicate that an erasure of at least a portion of the non-volatile memory array was detected. In combination with any of the above embodiments, the system may include a fifth logic to receive, subsequent to storage of the wakeup code value to the wakeup code location, a first read request directed to the wakeup code location, and a sixth logic to return the wakeup code value. In combination with any of the above embodiments, the system may include a fifth logic to receive, subsequent to storage of the wakeup code value to the wakeup code location, a first read request directed to the wakeup code location, a sixth logic to return the wakeup code value, a seventh logic to receive a second read request directed to the wakeup code location, and an eighth logic to return the alternate value. In combination with any of the above embodiments, the system may include a fifth logic to receive input to represent a secure boot sequence, a wake-up sequence, or an exception-handling sequence, and a sixth logic to store the input to the non-volatile memory array. In combination with any of the above embodiments, the system may include a fifth logic to receive, from a processor, input to represent context for the resumption of operation by the processor upon a wake-up from the deep sleep state, and a sixth logic to store the input to the non-volatile memory array. In combination with any of the above embodiments, the system may include a processor. The processor may include a first logic to store, prior to a deep sleep state in which the processor is powered down, a wakeup code value to a second wakeup code location in a power domain for which power is maintained in the deep sleep state, a second logic to store, prior to the deep sleep state, the wakeup code value the wakeup code location in the write detect block, a third logic to compare, subsequent to a wake-up from the deep sleep state and prior to completion of a boot operation, a value read from the wakeup code location in the write detect block and a value read from the second wakeup code location, a fourth logic to determine whether the value read from the wakeup code location in the write detect block and the value read from the second wakeup code location match, and a fifth logic to trigger, in response to a determination that the value read from the wakeup code location in the write detect block and the value read from the second wakeup code location do not match, action by an exception handling circuit. In any of the above embodiments, the non-volatile memory device may be a flash memory device. In any of the above embodiments, the non-volatile memory array may be a flash memory array.

Some embodiments of the present disclosure include a system for executing instructions. In at least some of these embodiments, the system may include means for receiving a wakeup code value, storing the wakeup code value to a non-volatile wakeup code location, detecting, subsequent to storing the wakeup code value to the wakeup code location, a condition or event that triggers replacement of the wakeup code value in the wakeup code location, and replacing the wakeup code value in the wakeup code location with an alternate value. In any of the above embodiments, the system may include a non-volatile memory array, and the wakeup code location may be outside of the non-volatile memory array. In any of the above embodiments, the condition or event may be indicative of potential tampering activity. In any of the above embodiments, the alternate value may be a reserved or restricted value to represent a NULL value. In any of the above embodiments, the alternate value may be one of multiple reserved or restricted values with which the wakeup value can be replaced. In combination with any of the above embodiments, the system may include a non-volatile memory array, and the means for detecting the condition or event may include means for detecting a write to the non-volatile memory array. In combination with any of the above embodiments, the means for detecting the condition or event may include means for detecting a write to the wakeup code location. In combination with any of the above embodiments, the system may include a non-volatile memory array, and the means for detecting the condition or event may include means for detecting the erasure of at least a portion of the non-volatile memory array. In any of the above embodiments, the system may include a non-volatile memory array, and the alternate value may be a reserved or restricted value to indicate that a write to the non-volatile memory array was detected. In any of the above embodiments, the alternate value may be a reserved or restricted value to indicate that a write to the wakeup code location was detected. In any of the above embodiments, the system may include a non-volatile memory array, and the alternate value may be a reserved or restricted value to indicate that an erasure of at least a portion of the non-volatile memory array was detected. In combination with any of the above embodiments, the system may include means for receiving, subsequent to storing the wakeup code value to the wakeup code location, a first read request directed to the wakeup code location, and means for returning the wakeup code value. In combination with any of the above embodiments, the system may include means for receiving, subsequent to storing the wakeup code value to the wakeup code location, a first read request directed to the wakeup code location, returning the wakeup code value, receiving a second read request directed to the wakeup code location, and returning the alternate value. In combination with any of the above embodiments, the system may include a non-volatile memory array, means for receiving input representing a secure boot sequence, a wake-up sequence, or an exception-handling sequence, and means for storing the input to the non-volatile memory array. In combination with any of the above embodiments, the system may include a non-volatile memory array, means for receiving, from a processor, input representing context for the resumption of operation by the processor upon a wake-up from the deep sleep state, and means for storing the input to the non-volatile memory array. In any of the above embodiments, the system may include a flash memory device. In any of the above embodiments, the non-volatile memory array may be a flash memory array.

What is claimed is:

1. A processor, comprising:
   a first circuitry to store, prior to a deep sleep state in which the processor is powered down, a wakeup code value to a first wakeup code location in a first power domain, wherein power is maintained for the first power domain in the deep sleep state;
   a second circuitry to store, prior to the deep sleep state, the wakeup code value to a second wakeup code location in a non-volatile memory device, wherein the non-volatile memory device is outside of the first power domain;
   a third circuitry to, subsequent to a wake-up from the deep sleep state and prior to completion of a boot operation, read the wakeup code value from the first wakeup code location of the first power domain for which power is maintained in the deep sleep state and compare the wakeup code value read from the first wakeup code location and a value read from the second wakeup code location of the non-volatile memory device;
   a fourth circuitry to determine whether the wakeup code value read from the first wakeup code location and the value read from the second wakeup code location match; and
   a fifth circuitry to trigger, in response to a determination that the wakeup code value read from the first wakeup code location and the value read from the second wakeup code location do not match, action by an exception handling circuit.

2. The processor of claim 1, further comprising:
   a sixth circuitry to generate a random number or a pseudorandom number as the wakeup code value.

3. The processor of claim 1,
   wherein the exception handling circuit comprises a sixth circuitry to execute a secure boot sequence by the processor.

4. The processor of claim 1,
   wherein the exception handling circuit comprises a sixth circuitry to restart the processor or to power down the processor.

5. The processor of claim 1, further comprising:
   a sixth circuitry to store, to the non-volatile memory device prior to the deep sleep state, context for resumption of operation by the processor upon a wake-up from the deep sleep state.

6. The processor of claim 1, further comprising:
a sixth circuitry to store, to the non-volatile memory device prior to the deep sleep state, context for resumption of operation by the processor upon a wake-up from the deep sleep state; and
a seventh circuitry to execute a wake-up sequence by the processor, in response to a determination that the value read from the first wakeup code location and the value read from the second wakeup code location match, wherein execution of the wake-up sequence comprises one or more accesses to the context stored to the non-volatile memory device.

7. The processor of claim 1, further comprising:
a sixth circuitry to determine that the processor will enter the deep sleep state; and
a seventh circuitry to initiate entry into the deep sleep state.

8. The processor of claim 1, further comprising:
a sixth circuitry to implement a plurality of low power states, wherein the plurality of low power states includes the deep sleep state; and
a seventh circuitry to maintain power for fewer power domains in the deep sleep state than a number of power domains for which it maintains power in at least one other one of the plurality of low power states.

9. The processor of claim 1, further comprising:
a sixth circuitry to determine, dependent on the value read from the second wakeup code location, whether potentially malicious activity was directed to the non-volatile memory device while the processor was in the deep sleep state.

10. A method, comprising, in a processor:
storing, prior to a deep sleep state, a wakeup code value to a first wakeup code location in a first power domain, wherein power is maintained for the first power domain in the deep sleep state, and wherein power is shut down for one or more other power domains in the deep sleep state;
storing, prior to the deep sleep state, the wakeup code value to a second wakeup code location in a non-volatile memory device, wherein the non-volatile memory device is outside of the first power domain;
entering the deep sleep state, wherein entering the deep sleep state comprising shutting down power to the one or more other power domains;
waking up from the deep sleep state, wherein waking up comprising restoring power to the one or more other power domains; and
beginning, subsequent to waking up from the deep sleep state and prior to completing a boot operation, execution of a wake-up sequence, wherein beginning execution of the wake-up sequence comprises:
reading the wakeup code value from the first wakeup code location of the first power domain for which power is maintained in the deep sleep state;
comparing a value read from the second wakeup code location of the non-volatile memory device to the wakeup code value read from the first wakeup code location of the first power domain for which power is maintained in the deep sleep state; and
determining whether the value read from the second wakeup code location and the wakeup code value read from the first wakeup code location match.

11. The method of claim 10, further comprising:
executing, in response to determining that the wakeup code value read from the first wakeup code location and the value read from the second wakeup code location do not match, an exception handling sequence;
wherein executing the exception handling sequence comprises:
executing a secure boot sequence;
initiating a restart; or
powering down one or more power domains.

12. The method of claim 10, further comprising:
generating, prior to the deep sleep state, a locally or temporally unique wakeup code value for the deep sleep state.

13. The method of claim 10, further comprising:
storing to the non-volatile memory device prior to the deep sleep state, context for resuming operation by the processor upon waking up from the deep sleep state; and
continuing to execute the wake-up sequence, in response to determining that the wakeup code value read from the first wakeup code location and the value read from the second wakeup code location match, wherein continuing to execute the wake-up sequence comprises accessing the context stored to the non-volatile memory device.

14. The method of claim 10, further comprising:
determining, dependent on the value read from the second wakeup code location, whether potentially malicious activity was directed to the non-volatile memory device while in the deep sleep state.

15. A system, comprising:
a processor to execute instructions;
a plurality of power domains; and
a power management circuit to regulate power for the plurality of power domains;
wherein a first power domain of the plurality of power domains is to remain powered on in a deep sleep state in which the processor is powered down; and
wherein the processor is further to:
store, prior to the deep sleep state, a wakeup code value to a first wakeup code location in the first power domain;
store, prior to the deep sleep state, the wakeup code value to a second wakeup code location in a non-volatile memory device, wherein the non-volatile memory device is outside of the first power domain;
subsequent to a wake-up from the deep sleep state and prior to completion of a boot operation, read the wakeup code value from the first wakeup code location of the first power domain for which power is maintained in the deep sleep state and compare the wakeup code value read from the first wakeup code location and a value read from the second wakeup code location of the non-volatile memory device;
determine whether the wakeup code value read from the first wakeup code location and the value read from the second wakeup code location match; and
trigger, in response to a determination that the wakeup code value read from the first wakeup code location and the value read from the second wakeup code location do not match, action by an exception handling circuit.

16. The system of claim 15, wherein the processor is further to:
store, to the non-volatile memory device prior to the deep sleep state, context for resumption of operation by the processor upon a wake-up from the deep sleep state; and execute a wake-up sequence by the processor, in response to a determination that the value read from the first wakeup code location and the value read from the second wakeup code location match, wherein execution of the wake-up sequence comprises one or more accesses to the context stored to the non-volatile memory device.

17. The system of claim 15, wherein the exception handling circuit comprises one or more of:
   a first circuitry to execute a secure boot sequence by the processor;
   a second circuitry to initiate a restart of the system; or
   a third circuitry to power down one or more of the plurality of power domains.

18. The system of claim 15, wherein the power management circuit comprises:
   a first circuitry to determine that the system will enter the deep sleep state, wherein a determination that the system will enter the deep sleep state is dependent on detection of inactivity in the system or execution of an instruction to initiate entry into the deep sleep state by the processor; and
   a second circuitry to power down one or more of the plurality of power domains other than the first power domain.

19. The system of claim 15, wherein the power management circuit comprises:
   a first circuitry to determine that the system will enter the deep sleep state; and
   a second circuitry to notify the processor that the system will enter the deep sleep state.

20. The system of claim 15, wherein the power management circuit comprises:
   a first circuitry to detect a wake-up event; and
   a second circuitry to power up one or more of the plurality of power domains in response to detection of the wake-up event, wherein the one or more of the plurality of power domains were powered down upon entry into the deep sleep state, and wherein the one or more of the plurality of power domains does not include the first power domain.

21. The system of claim 15, wherein the first power domain that comprises the first wakeup code location further comprises a real-time clock circuit to track a current time.

22. The system of claim 15, wherein the action that is triggered by the exception handling circuit is selected, based on the value read from the second wakeup code location, from a plurality of actions that each correspond to a different reserved wakeup code value.

23. The system of claim 15, wherein the processor is further to:
   prior to entering the deep sleep state, generate a random or pseudorandom number;
   determine that the random or pseudorandom number is a reserved value based on a comparison of the random or pseudorandom number with a list of reserved wakeup code values;
   discard the random or pseudorandom number; and
   generate a second random or pseudorandom number for use as the wakeup code value.

* * * * *